(12) United States Patent
Nishibe

(10) Patent No.: US 11,508,084 B2
(45) Date of Patent: Nov. 22, 2022

(54) INFORMATION PROCESSING APPARATUS AND INFORMATION PROCESSING METHOD FOR ACCURATELY ESTIMATING A SELF LOCATION

(71) Applicant: SONY CORPORATION, Tokyo (JP)

(72) Inventor: Mitsuru Nishibe, Chiba (JP)

(73) Assignee: SONY CORPORATION, Tokyo (JP)

(*) Notice: Subject to any disclaimer, the term of this patent is extended or adjusted under 35 U.S.C. 154(b) by 278 days.

(21) Appl. No.: 16/758,391

(22) PCT Filed: Oct. 3, 2018

(86) PCT No.: PCT/JP2018/036983
§ 371 (c)(1),
(2) Date: Apr. 22, 2020

(87) PCT Pub. No.: WO2019/087658
PCT Pub. Date: May 9, 2019

(65) Prior Publication Data
US 2020/0342617 A1      Oct. 29, 2020

(30) Foreign Application Priority Data

Nov. 1, 2017 (JP) .............................. JP2017-212051

(51) Int. Cl.
*G06T 7/70* (2017.01)
*G01B 11/26* (2006.01)
(Continued)

(52) U.S. Cl.
CPC ................ *G06T 7/70* (2017.01); *G01B 11/26* (2013.01); *G02B 27/017* (2013.01); *G06F 3/011* (2013.01); *G06T 19/006* (2013.01)

(58) Field of Classification Search
CPC ........... G06T 7/70; G06T 19/006; G06T 7/74; G06T 2207/30244; G01B 11/26;
(Continued)

(56) References Cited

U.S. PATENT DOCUMENTS 10,948,299 B1 *   3/2021   Zhang ................ G01C 21/1656
2011/0140994 A1   6/2011   Noma
(Continued)

FOREIGN PATENT DOCUMENTS

CN   104718561 A   6/2015
CN   105987694 A   10/2016
(Continued)

OTHER PUBLICATIONS

International Search Report and Written Opinion of PCT Application No. PCT/JP2018/036983, dated Nov. 27, 2018, 09 pages of ISRWO.

(Continued)

*Primary Examiner* — Jeffery A Brier
(74) *Attorney, Agent, or Firm* — Chip Law Group

(57) ABSTRACT

An information processing apparatus according to the present technology includes an imaging unit, an inertial sensor, and a control unit. The imaging unit acquires image information. The inertial sensor acquires inertial information. The control unit estimates a self location of the information processing apparatus on the basis of the image information and the inertial information, recognizes a situation of a user with the information processing apparatus, and changes a ratio of reliability between the image information and the inertial information that are to be used for estimating the self location depending on the situation.

20 Claims, 16 Drawing Sheets

(51) Int. Cl.
*G02B 27/01* (2006.01)
*G06F 3/01* (2006.01)
*G06T 19/00* (2011.01)

(58) Field of Classification Search
CPC ... G02B 27/017; G06F 3/011; G01C 21/1656; G01C 21/3602; G01C 21/365
See application file for complete search history.

(56) References Cited

U.S. PATENT DOCUMENTS

| | | | |
|---|---|---|---|
| 2013/0084981 A1* | 4/2013 | Zalewski | A63F 13/211 463/36 |
| 2014/0104437 A1 | 4/2014 | Chao et al. | |
| 2015/0178924 A1 | 6/2015 | Chao et al. | |
| 2016/0232677 A1 | 8/2016 | Liao et al. | |
| 2018/0089841 A1* | 3/2018 | Dai | G01P 15/08 |

FOREIGN PATENT DOCUMENTS

| | | |
|---|---|---|
| CN | 107194969 A | 9/2017 |
| EP | 3012804 A1 | 4/2016 |
| EP | 3657122 A1 | 5/2020 |
| ES | 2776674 T3 | 7/2020 |
| JP | 2009-031295 A | 2/2009 |
| JP | 2011-128220 A | 6/2011 |
| JP | 2015-005220 A | 1/2015 |
| JP | 2015-166816 A | 9/2015 |
| JP | 5893802 B2 | 3/2016 |
| JP | 2017-072560 A | 4/2017 |
| JP | 6142931 B2 | 6/2017 |
| JP | 2017-181666 A | 10/2017 |
| JP | 6239659 B2 | 11/2017 |
| JP | 2019-020333 A | 2/2019 |
| KR | 10-2015-0070277 A | 6/2015 |
| KR | 10-2016-0018847 A | 2/2016 |
| WO | 2014/062293 A1 | 4/2014 |
| WO | 2019/017300 A1 | 1/2019 |

OTHER PUBLICATIONS

Extended European Search Report of EP Application No. 18872105.4, dated Oct. 15, 2020, 07 pages.

* cited by examiner

INFORMATION PROCESSING APPARATUS AND INFORMATION PROCESSING METHOD FOR ACCURATELY ESTIMATING A SELF LOCATION

CROSS REFERENCE TO RELATED APPLICATIONS

This application is a U.S. National Phase of International Patent Application No. PCT/JP2018/036983 filed on Oct. 3, 2018, which claims priority benefit of Japanese Patent Application No. JP 2017-212051 filed in the Japan Patent Office on Nov. 1, 2017. Each of the above-referenced applications is hereby incorporated herein by reference in its entirety.

TECHNICAL FIELD

The present technology relates to a technology regarding an information processing apparatus or the like that estimates a self location.

BACKGROUND ART

In recent years, VR technologies (virtual reality) of causing a person to feel as if he/she were in a virtual space via visual perception, and AR (augmented reality) technologies of displaying virtual objects in such a manner that the virtual objects overlap real objects in a real world have been widely known. The VR technologies and the AR technologies are installed in various kinds of information processing apparatuses such as a head-mounted display and a smartphone, for example.

It is necessary for the AR technologies and the VR technologies to accurately estimate a self location of an information processing apparatus (for example, see Patent Literature 1 listed below).

CITATION LIST

Patent Literature

Patent Literature 1: JP 2017-072560A

DISCLOSURE OF INVENTION

Technical Problem

However, there is a problem of reduction in accuracy of estimation of the self location in the case where a user with the information processing apparatus (such as a head-mounted display) is in a specific situation such as a situation where the user is in a vehicle such as a car or a train.

In view of the circumstance as described above, a purpose of the present technology is to provide a technology capable of accurately estimating the self location even in the case where the user with the information processing apparatus is in a specific situation such as a situation where the user is in a vehicle such as a car or a train.

Solution to Problem

An information processing apparatus according to the present technology includes an imaging unit, an inertial sensor, and a control unit.

The imaging unit acquires image information.

The inertial sensor acquires inertial information.

The control unit estimates a self location of the information processing apparatus on the basis of the image information and the inertial information, recognizes a situation of a user with the information processing apparatus, and changes a ratio of reliability between the image information and the inertial information that are to be used for estimating the self location depending on the situation.

Accordingly, it is possible to accurately estimate the self location even in the case where the user with the information processing apparatus is in a specific situation such as a situation where the user is in a vehicle such as a car or a train.

With regard to the information processing apparatus, the control unit may extract feature quantities from the image information, and determine which of the feature quantities is to be used for estimating the self location depending on the situation.

With regard to the information processing apparatus, the control unit may be capable of setting one or more coordinate systems depending on the situation, and estimate a self location in each of the one or more coordinate systems.

With regard to the information processing apparatus, the control unit may change the ratio in such a manner that the one or more coordinate systems have different ratios.

With regard to the information processing apparatus, one or more coordinate systems may include a first mobile object coordinate system based on a first mobile object that moves while carrying the user, and the control unit may change the ratio in such a manner that, among the image information and the inertial information, the image information is to be used more reliably for estimating a self location in the first mobile object coordinate system.

With regard to the information processing apparatus, the control unit may change the ratio in such a manner that, among the image information and the inertial information, only the image information is to be used reliably for estimating a self location in the first mobile object coordinate system.

With regard to the information processing apparatus, the one or more coordinate systems may include a second mobile object coordinate system based on a second mobile object that moves without relation to the user, and the control unit may change the ratio in such a manner that, among the image information and the inertial information, the image information is to be used more reliably for estimating a self location in the second mobile object coordinate system.

With regard to the information processing apparatus, the control unit may change the ratio in such a manner that, among the image information and the inertial information, only the image information is to be used reliably for estimating a self location in the second mobile object coordinate system.

With regard to the information processing apparatus, the control unit may estimate the self location through a Kalman filtering process, and the ratio may be Kalman gain.

With regard to the information processing apparatus, the control unit may extract feature quantities from the image information, and determine which of the feature quantities in the image information is to be used for estimating the self location in each of the one or more coordinate systems.

With regard to the information processing apparatus, the control unit may determine degrees of coincidence between the inertial information and movements of the feature quantities, and determine which of the feature quantities in the image information is to be used for estimating the self location in each of the one or more coordinate systems on the basis of the degrees of coincidence.

With regard to the information processing apparatus, the one or more coordinate systems may include a world coordinate system based on the earth, and a first mobile object coordinate system based on a first mobile object that moves while carrying the user, and the control unit may determine whether the first mobile object coordinate system is separated from the world coordinate system on the basis of the image information, and set the first mobile object coordinate system when the separation has occurred.

With regard to the information processing apparatus, when the separation has occurred, the control unit may recalculate the self location retroactive to a predetermined time before a timing at which the separation has occurred, in estimation of the self location in the world coordinate system.

With regard to the information processing apparatus, when the separation has occurred, the control unit may recalculate the self location retroactive to a predetermined time before a timing at which the separation has occurred, in estimation of the self location in the first mobile object coordinate system.

With regard to the information processing apparatus, the one or more coordinate systems may include a world coordinate system based on the earth, and a second mobile object coordinate system based on a second mobile object that moves without relation to the user, and the control unit may determine whether the second mobile object coordinate system is separated from the world coordinate system on the basis of the image information, and set the second mobile object coordinate system when the separation has occurred.

With regard to the information processing apparatus, when the separation has occurred, the control unit may recalculate the self location retroactive to a predetermined time before a timing at which the separation has occurred, in estimation of the self location in the world coordinate system.

With regard to the information processing apparatus, when the separation has occurred, the control unit may recalculate the self location retroactive to a predetermined time before a timing at which the separation has occurred, in estimation of the self location in the second mobile object coordinate system.

With regard to the information processing apparatus, for each of the one or more coordinate systems, the control unit may change a parameter related to image capturing performed by the imaging unit.

An information processing method according to the present technology includes: estimating a self location of an information processing apparatus on the basis of image information and inertial information; recognizing a situation of a user with the information processing apparatus; and changing a ratio of reliability between the image information and the inertial information that are to be used for estimating the self location, depending on the situation.

A program according to the present technology causes a computer to function as a control unit that: estimates a self location of an information processing apparatus on the basis of image information and inertial information; recognizes a situation of a user with the information processing apparatus; and changes a ratio of reliability between the image information and the inertial information that are to be used for estimating the self location, depending on the situation.

Advantageous Effects of Invention

As described above, according to the present technology, it is possible to provide a technology that makes it possible to accurately estimate a self location even in the case where the user with the information processing apparatus is in a specific situation such as a situation where the user is in a vehicle such as a car or a train.

MODE(S) FOR CARRYING OUT THE INVENTION

Hereinafter, embodiments of the present technology will be described with reference to the drawings.

First Embodiment

<Entire Configuration of HMD 100 and Configurations of Respective Structural Elements of HMD 100>>

Figure 1:
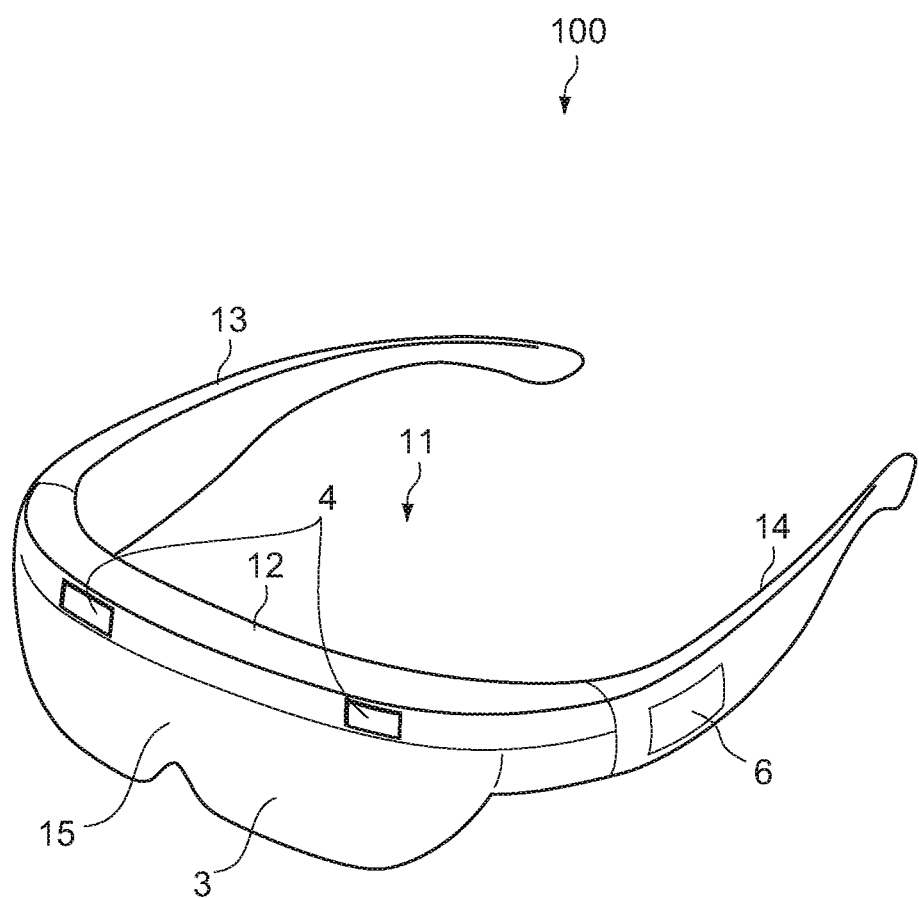
FIG. 1 is a perspective view of an HMD according to a first embodiment of the present technology.
Figure 2:
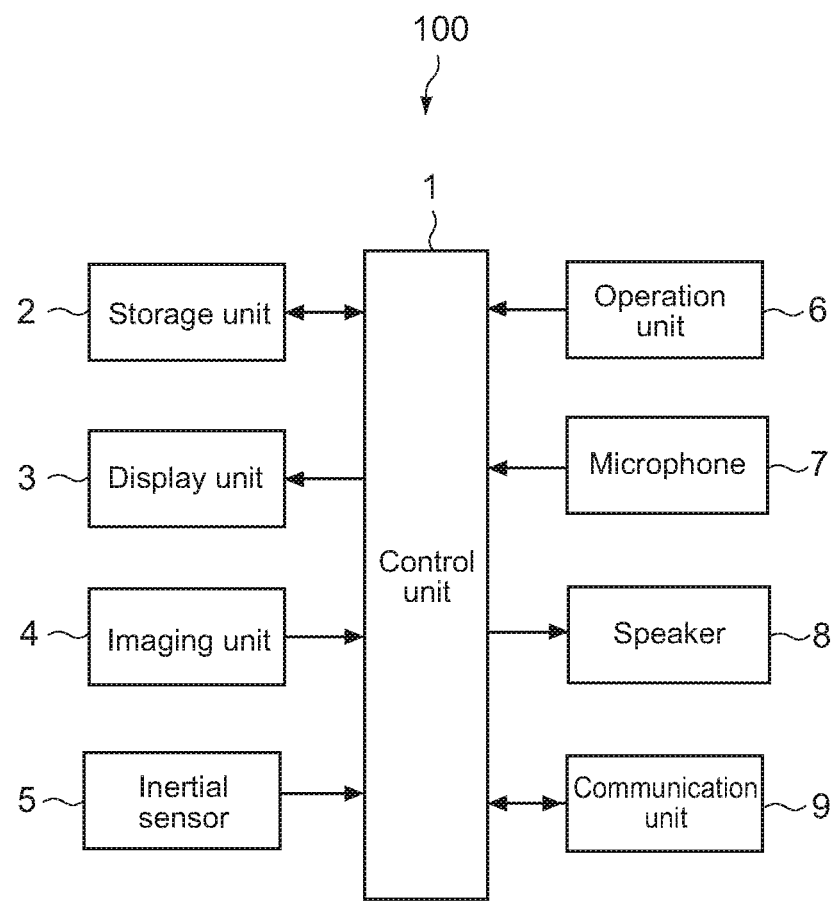
FIG. 2 is a block diagram illustrating an internal configuration of the HMD.

FIG. 1 is a perspective view of a head-mounted display (hereinafter, referred to as an HMD) 100 according to a first embodiment of the present technology. FIG. 2 is a block diagram illustrating an internal configuration of the HMD 100.

As illustrated in FIG. 1 and FIG. 2, the HMD 100 (an information processing apparatus) includes an HMD main body 11, a control unit 1, a storage unit 2, a display unit 3, imaging units 4, an inertial sensor 5, an operation unit 6, a microphone 7, a speaker 8, and a communication unit 9.

The HMD main body 11 is used while being worn on a head of a user. The HMD main body 11 includes a front unit 12, a right temple unit 13 provided on a right side of the front unit 12, a left temple unit 14 provided on a left side of the front unit 12, and a glass unit 15 attached below the front unit 12.

The display unit 3 is a see-through display unit, and is provided on a front surface of the glass unit 15. The display unit 3 displays virtual objects 20 (see FIG. 10) under the control of the control unit 1. This makes it possible to cause a user to recognize the virtual objects 20 as if the virtual objects 20 were placed in a real space seen by the user via the glass unit 15. Note that, the display unit 3 may be a display unit that is not see-through. In this case, the display unit 3 displays an image captured by the imaging units 4.

The imaging unit 4 is a camera, for example. The imaging unit 4 includes an image sensor such as a charge coupled device (CCD) sensor or a complementary metal oxide semiconductor (CMOS) sensor, and an optical system such as an imaging lens. The imaging units 4 are provided on an outer surface of the front unit 12 in such a manner that the imaging units 4 face outward. The imaging unit 4 captures an image of objects that are present along the line of sight of the user, and outputs image information obtained through the image capturing to the control unit 1. The two imaging units 4 are provided on the front unit 12 with a predetermined space therebetween in a lateral direction. Note that, the place to install the imaging units 4 and the number of imaging units 4 can be appropriately modified.

The imaging units 4 may further includes imaging units that capture images of eyes of the user. The imaging units 4 are provided on an inner surface side of the front unit 12 in such a manner that the imaging units 4 face inward. The images of the eyes captured by the imaging units 4 may be used for estimating lines of sight of the eyes, for example.

The inertial sensor 5 includes a triaxial acceleration sensor that detects acceleration in triaxial directions, and an angular velocity sensor that detects angular velocities about three axes. The inertial sensor 5 outputs the acceleration in the triaxial directions and the angular velocities about the three axes that have been obtained through detection as inertial information to the control unit 1.

According to the present embodiment, the number of detection axes of the inertial sensor 5 are three. However, the number of detection axes may be one or two. In addition, according to the present embodiment, the two types of sensors are used as the inertial sensor 5. However, it is also possible to use one or three or more types of sensor as the inertial sensor 5. Note that, other examples of the inertial sensor 5 include a speed sensor, an angle sensor, and the like.

The operation unit 6 is, for example, various types of operation units such as a press-type operation unit or a contact-type operation unit. The operation unit 6 detects operation performed by the user and outputs the detected operation to the control unit 1. In the example illustrated in FIG. 1, the operation unit 6 is provided on an anterior side of the left temple unit 14. However, the operation unit 6 may be placed in any location as long as the operation unit 6 is operable by the user.

The microphone 7 converts voice of the user and environmental sound around the user into electric signals and outputs the signals to the control unit 1. For example, the speaker 8 outputs, as sound, auxiliary information related to the virtual objects 20 (see FIG. 10) displayed on the display unit 3.

The communication unit 9 communicates with an external device directly or indirectly, for example.

The control unit 1 includes a central processing unit (CPU) or the like. The control unit 1 performs various computations on the basis of various kinds of programs stored in the storage unit 2, and integrally controls respective structural elements of the HMD 100. Note that, details of processes performed by the control unit 1 will be described later in paragraphs related to description of operation.

The storage unit 2 includes non-volatile memory that stores various kinds of data and programs necessary for the processes performed by the control unit 1, and volatile memory used as a workspace for the control unit 1. Note that, the various kinds of programs may be read out from a portable recording medium such as an optical disc or a semiconductor memory, or may be downloaded from a server apparatus on a network.

<Basic Concept>

Next, basic concepts of the present technology will be described. One of the purposes of the present technology is to accurately estimate a self location in a specific coordinate system while a user is wearing the HMD 100 (the user is with the HMD 100) and is in a mobile object (a first mobile object).

Figure 10:
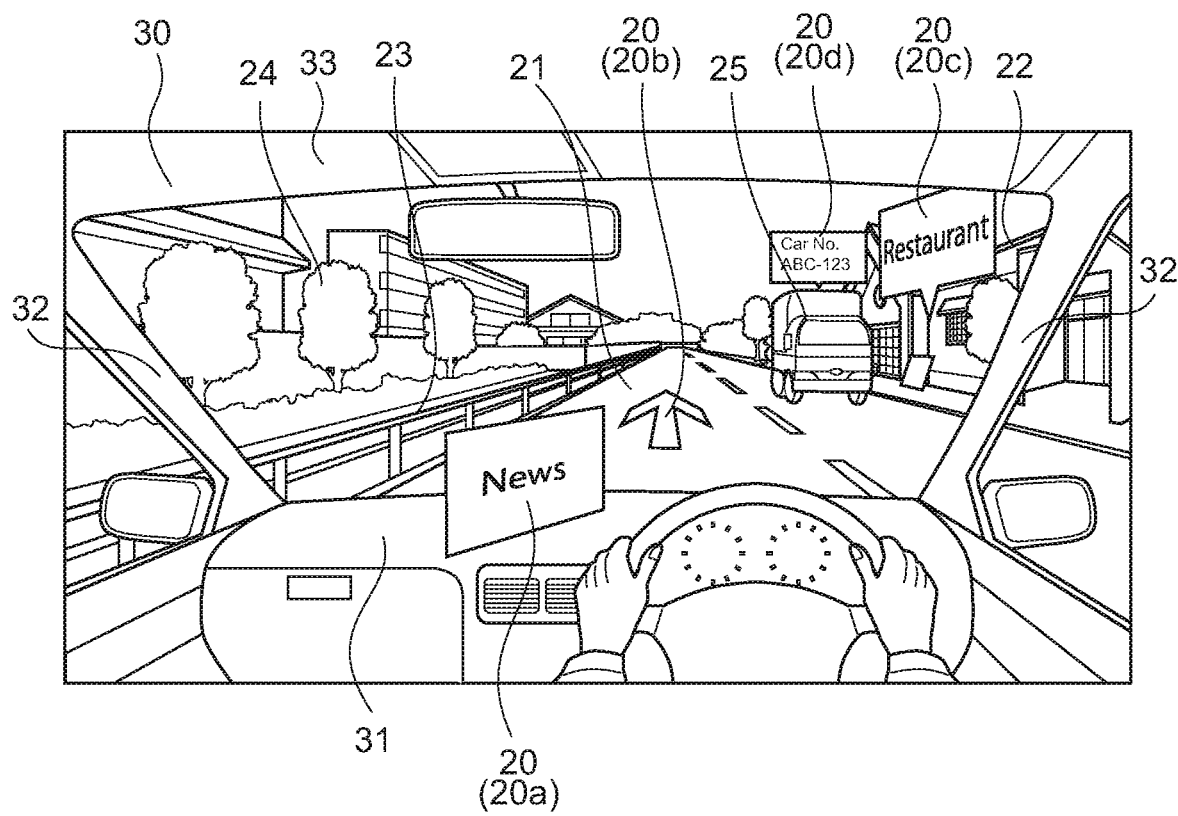
FIG. 10 is a diagram illustrating an example of a field of view seen by a user via a glass unit and a display unit while the user is driving a car.

Here, first, it is assumed that the user is driving a car while he/she is wearing the HMD 100. FIG. 10 is a diagram illustrating an example of a field of view seen by the user via the glass unit 15 and the display unit 3 while the user is driving a car according to the present embodiment.

In the example illustrated in FIG. 10, virtual objects 20 are displayed in an AR manner (hereinafter, such AR display may be referred to as placement (localization)). The AR display means display of the virtual objects 20 in such a manner that the user perceives the virtual objects 20 as if the virtual objects 20 were real objects present in the real space.

In the example illustrated in FIG. 10, a virtual object 20a including information regarding news is placed above a dashboard 31 of a car 30. In addition, an arrow virtual object 20b for route guidance is placed above a road 21. In addition, a virtual object 20c including information regarding a building is placed near a building 22. In addition, a virtual object 20d including information regarding an oncoming car is placed above the oncoming car 25.

Note that, the virtual objects 20 may be any objects such as objects related to information regarding news, email, a schedule, a clock, weather, music, a game, route guidance, a real object, and the like.

According to the present embodiment, as described later, a self location of the HMD 100 is estimated on the basis of image information captured by the imaging units 4 and inertial information (acceleration in triaxial directions and angular velocities in the triaxial directions) detected by the inertial sensor 5.

The objects (the road 21 and the building 22) above/near which the arrow virtual object 20b for route guidance and the virtual object 20c including information regarding the building are placed belong to a world coordinate system based on the earth. Accordingly, in this case, a self location should be estimated in the world coordinate system.

On the other hand, the object (the dashboard 31) above which the virtual object 20a including the information regarding the news is displayed belongs to a mobile object coordinate system (a first mobile object coordinate system) based on the car 30. Accordingly, in this case, a self location should be estimated in the mobile object coordinate system (the first mobile object coordinate system) based on the car 30 instead of the world coordinate system based on the earth.

On the other hand, the inertial information acquired by the inertial sensor 5 is not a value based on the mobile object coordinate system (the first mobile object coordinate system) based on the car 30. The inertial information is always a value based on the world coordinate system based on the earth.

Therefore, when the self location in the mobile object coordinate system (the first mobile object coordinate system) based on the car 30 is estimated on the basis of the image information and the inertial information, the inertial information having low reliability in the mobile object coordinate system is reflected in the estimation of the self location unless some measure is taken.

In this case, the self location in the mobile object coordinate system (the first mobile object coordinate system) is inaccurately estimated, and it becomes impossible to accurately place the virtual object 20*a* above the dashboard 31 of the car 30. For example, a situation where the virtual object 20*a* moves toward the backside of the car 30 and the user cannot see the virtual object 20*a* arises.

According to the present embodiment, a process for preventing such a situation from arising is performed. Typically, a situation of the user who is wearing the HMD 100 (the user with the HMD 100) (for example, whether or not the user is in the car 30) is recognized, and a ratio of reliability between the image information and the inertial information that are to be used for estimating the self location is changed depending on the situation.

The basic concepts of the present technology have been described above.

Figure 11:
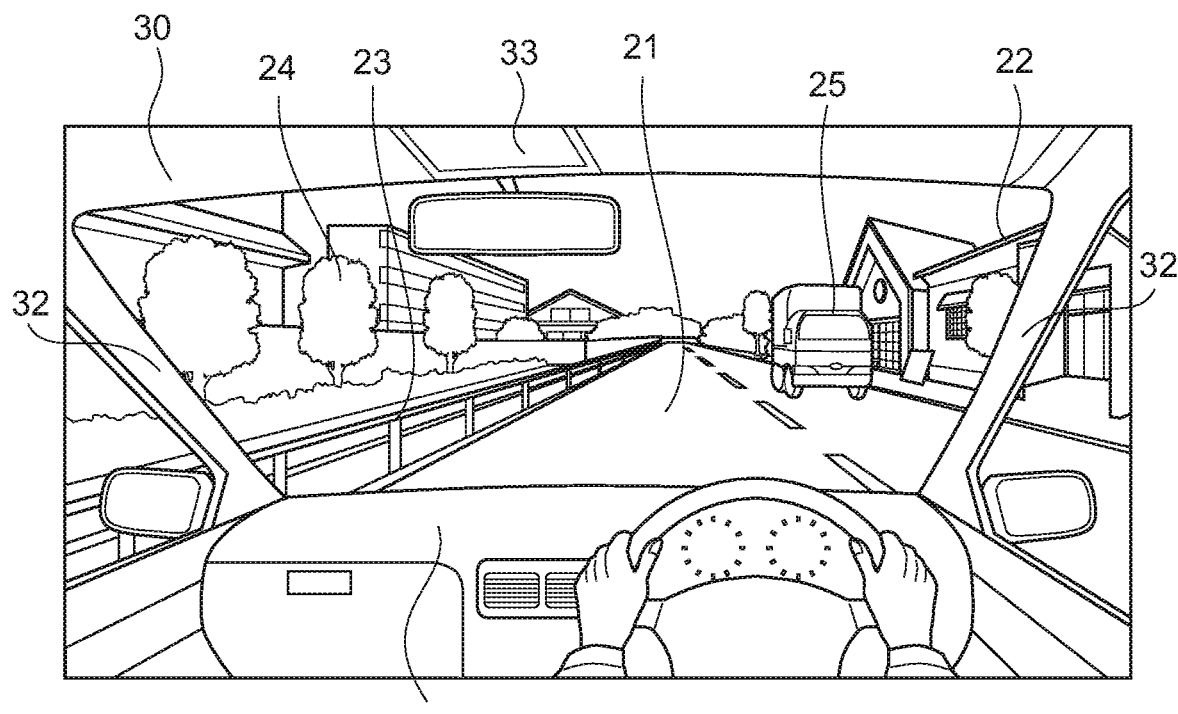
FIG. 11 is a diagram illustrating an example of image information acquired by imaging units while the user is driving the car.

Next, as a supplement of the basic concepts of the present technology, how to treat the image information will be described. FIG. 11 is a diagram illustrating an example of the image information acquired by the imaging units 4 while the user is driving the car 30.

In the image information, the dashboard 31, frames 32, a ceiling 33, and the like of the car 30 are objects belonging to the mobile object coordinate system (the first mobile object coordinate system). On the other hand, the road 21, a traffic barrier 23, a tree 24, the building 22, and the like that are seen in the front direction through windows of the car 30 are objects belonging to the world coordinate system.

Accordingly, in a specific situation where the user is driving the car 30 or the like, the image information sometimes includes both the objects belonging to the mobile object coordinate system (the first coordinate system) and the objects belonging to the world coordinate system.

When the self location in the mobile object coordinate system (the first mobile object coordinate system) based on the car 30 is estimated on the basis of the image information, the objects belonging to the world coordinate system that are not related to the mobile object coordinate system are reflected in the estimation of the self location unless some measure is taken.

Therefore, also in this case, the self location in the mobile object coordinate system (the first mobile object coordinate system) is inaccurately estimated, and sometimes it becomes impossible to accurately place the virtual object 20*a* above the dashboard 31 of the car 30.

On the other hand, when the self location in the world coordinate system is estimated on the basis of the image information, the objects belonging to the first mobile object coordinate system that are not related to the world coordinate system are reflected in the estimation of the self location unless some measure is taken.

In the present embodiment, a process for preventing such a situation from arising is also performed. Typically, when estimating the self location, it is determined which feature quantity in the image information will be used depending on a situation of the user who is wearing the HMD 100 (the user with the HMD 100).

<Description of Operation>

Figure 3:
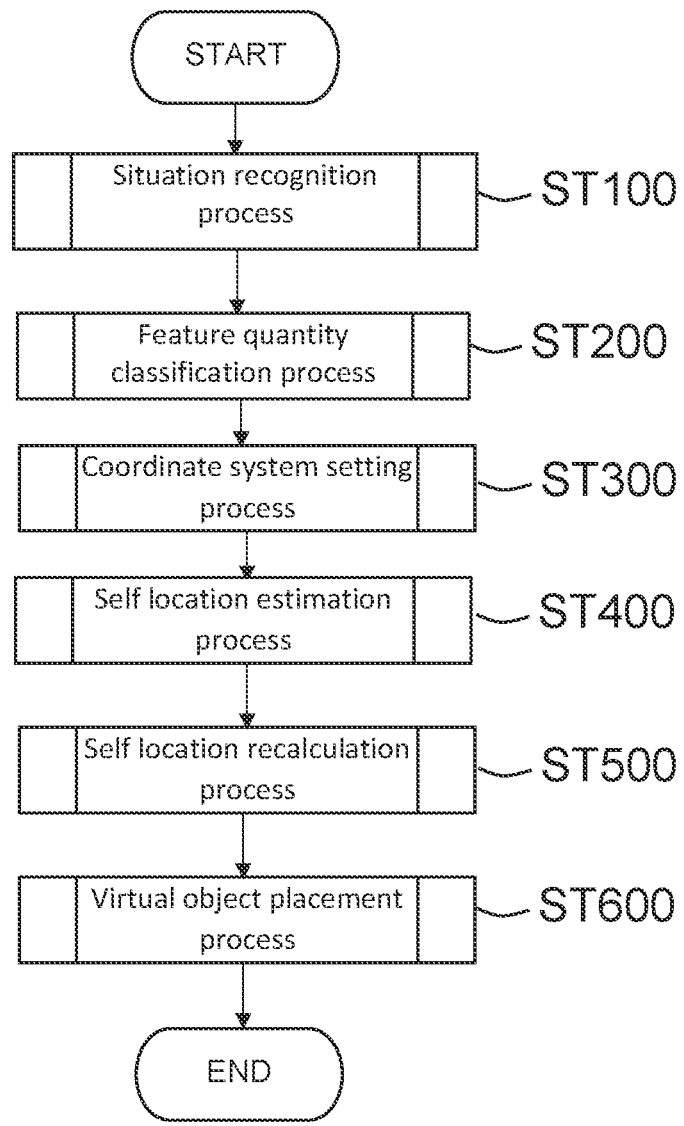
FIG. 3 is a flowchart illustrating processes performed by a control unit.

Next, details of processes performed by the control unit 1 will be described with reference to examples. FIG. 3 is a flowchart illustrating the processes performed by the control unit 1. The control unit 1 performs a situation recognition process (Step 100), a feature quantity classification process (Step 200), a coordinate system setting process (Step 300), a self location estimation process (Step 400), a self location recalculation process (Step 500), and a virtual object placement process (Step 600) in this order.

"Situation Recognition Process"

Figure 4:
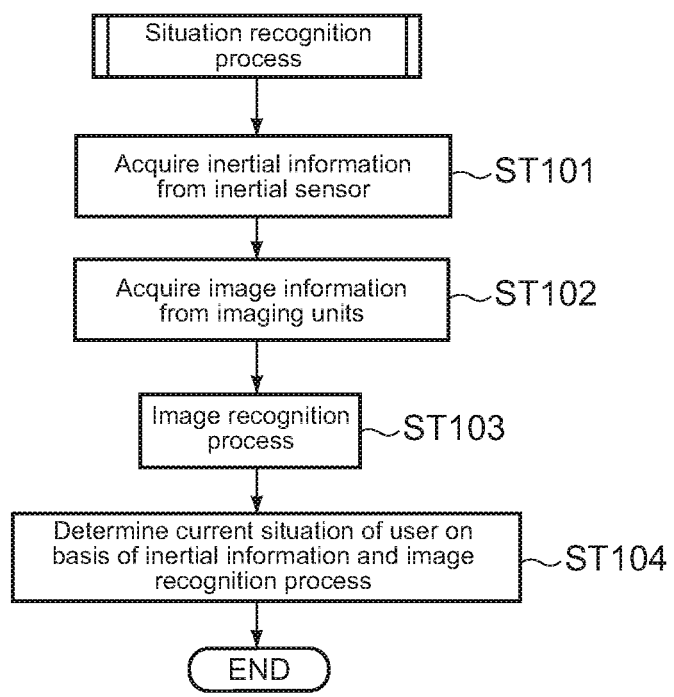
FIG. 4 is a flowchart illustrating a process performed by the control unit in a situation recognition process.

FIG. 4 is a flowchart illustrating a process performed by the control unit 1 in the situation recognition process. The control unit 1 first acquires inertial information (acceleration in triaxial directions and angular velocities about three axes) detected by the inertial sensor 5 (Step 101), and acquires image information captured by the imaging units 4 (Step 102).

Next, the control unit 1 performs an image recognition process on the basis of the image information (Step 103). Subsequently, the control unit 1 determines a current situation of the user who is wearing the HMD 100, on the basis of the inertial information and the image recognition process (Step S104).

When recognizing the situation, first, the control unit 1 roughly determines whether or not the user is in a first mobile object (whether the user is in or outside a building or the like). Note that, in the present specification, the first mobile object is a mobile object that moves while carrying the user who is wearing the HMD 100. For example, the first mobile object is the car 30, a bus, a train, an airplane, a cart, an elevator, an escalator, a bicycle, or the like. Typically, the first mobile object may be any mobile object as long as the mobile object is something that moves while carrying the user.

According to the present embodiment, it is determined that the user is in the first mobile object as long as the user is in the first mobile object even when the first mobile object is not moving. Note that, it is also possible to determine that the user is in the first mobile object when the user is in the first mobile object and the first mobile object is moving.

In this case, it is also possible to determine that a period from when the first mobile object coordinate system is separated from the world coordinate system (to be described later with reference to Step 305) to when the first mobile object coordinate system is integrated into the world coordinate system (to be described later with reference to Step 307) is the situation where the user is in the first mobile object.

In the case where the user is in the first mobile object, the type of the first mobile object is also determined (whether the first mobile object is the car 30, a train, or the like). In the case where the user is not in the first mobile object, it may be determined whether the user is in or outside a building or the like.

In addition, in the case where the user is in the first mobile object, behavior such as a still state (a sitting state, a standing state, or a sleeping state), a walking state, or a running state may be recognized while the user is in the first mobile object. In a similar way, behavior such as a still state (a sitting state, a standing state, or a sleeping state), a walking state, or a running state may be recognized even in the case where the user is not in the mobile object.

Note that, according to the present embodiment, the current state of the user is determined on the basis of both the inertial information and the image information (the image recognition process). However, it is also possible to determine the current state of the user on the basis of only one of the inertial information or the image information. In addition, it is also possible to determine the current state of the user on the basis of environmental sound or the like acquired through the microphone 7.

"Feature Quantity Classification Process"

Figure 5:
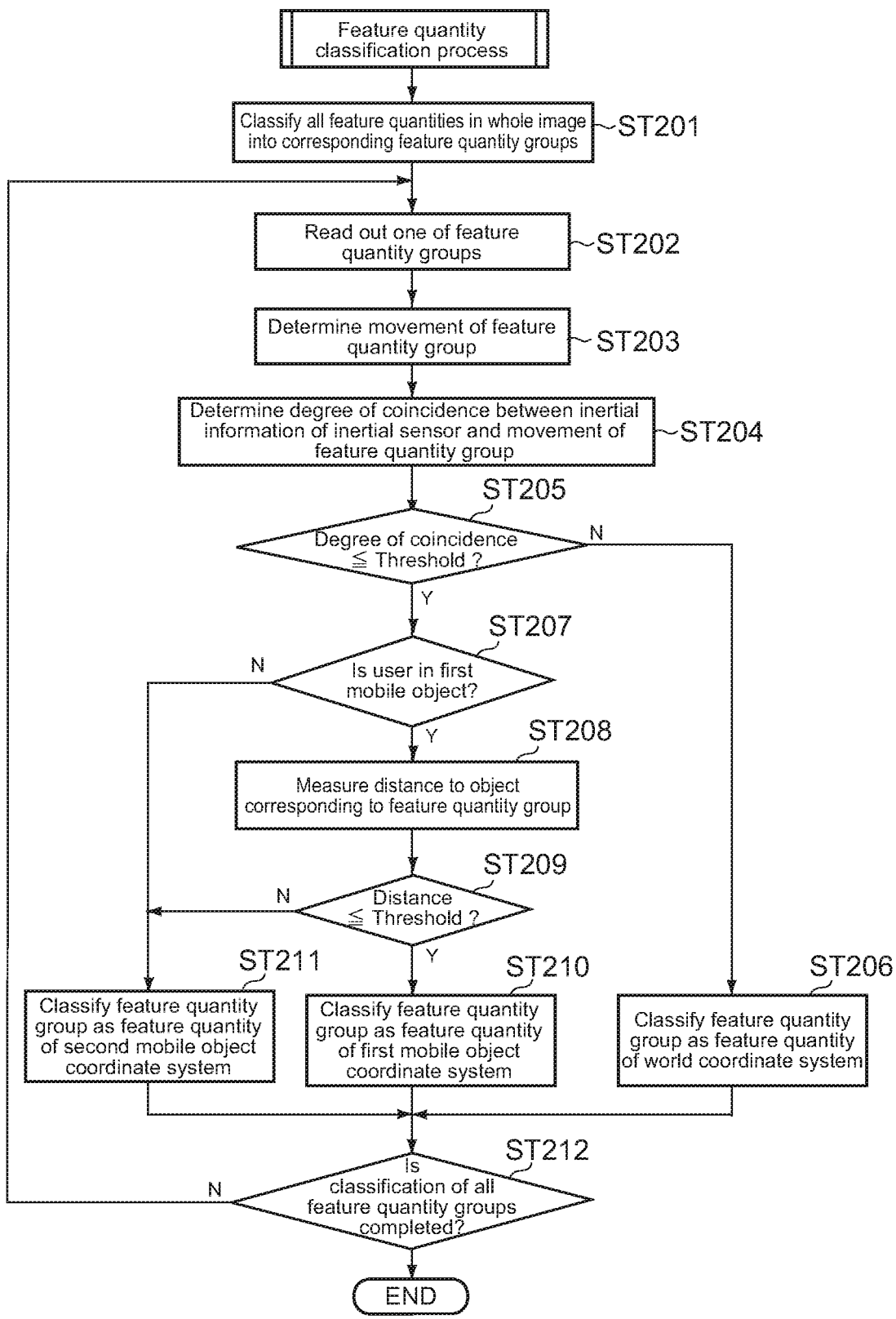
FIG. 5 is a flowchart illustrating a process performed by the control unit in a feature quantity classification process.

Next, the feature quantity classification process will be described. FIG. 5 is a flowchart illustrating a process performed by the control unit in the feature quantity classification process.

According to the present embodiment, feature quantity based on the image information is classified as feature quantity of one of the world coordinate system, the first mobile object coordinate system, or a second mobile object coordinate system.

Here, the world coordinate system is a coordinate system based on the earth. The first mobile object coordinate system is a coordinate system based on the first mobile object that moves while carrying the user who is wearing the HMD 100. The second mobile object coordinate system is a coordinate system based on a second mobile object that moves without relation to the user who is wearing the HMD 100.

Note that, with reference to FIG. 11, the second mobile object will be described. The second mobile object corresponds to the oncoming car 25 running on an opposite lane toward the car 30. Note that, in the case where a car running in front of the car 30, a pedestrian who is walking on a sidewalk, and the like are included in the image, they also correspond to second mobile objects. Typically, the second mobile object may be any mobile object as long as the mobile object is something that moves without relation to the user.

The control unit 1 first extracts feature quantities from the whole image in the image information through an image process, classifies respective extracted feature quantities into corresponding feature quantity groups, and stores them in the storage unit 2 (Step 201). For example, in the case where the image information is the example illustrated in FIG. 11, respective feature quantities corresponding to the dashboard 31, the frames 32, the ceiling 33, the road 21, the individual building 22, the traffic barrier 23, the individual tree 24, the oncoming car 25 are classified into different feature quantity groups.

Next, the control unit 1 reads out one of the feature quantity groups from the storage unit 2 (Step 202), and determines movement of the feature quantity group (Step 203). Subsequently, the control unit 1 determines a degree of coincidence between inertial information (acceleration in triaxial directions and angular velocities about three axes) acquired by the inertial sensor 5 and the movement of the feature quantity group (Step 204).

For example, an observation residual (a reciprocal of the observation residual) of the Kalman filtering process (to be described later) may be used as the degree of coincidence.

Next, the control unit 1 determines if the degree of coincidence between the inertial information and the movement of the feature quantity group is a threshold or less (Step 205). In the case where the degree of coincidence exceeds the threshold (No in Step 205), the control unit 1 classifies the feature quantity group as feature quantity of the world coordinate system (Step 206).

For example, in the example illustrated in FIG. 11, degrees of coincidence between the inertial information (acceleration in triaxial directions and angular velocities about the three axes) and movements of the respective feature quantity groups corresponding to the road 21, the traffic barrier 23, the individual tree 24, and the individual building 22 are high. Therefore, such feature quantity groups are classified as feature quantities of the world coordinate system.

On the other hand, the control unit 1 proceeds to next Step 207 in the case where the degree of coincidence between the inertial information acquired by the inertial sensor 5 and the movement of the feature quantity group is the threshold or less in Step 205 (Yes in Step 205).

For example, in the example illustrated in FIG. 11, degrees of coincidence between the inertial information (acceleration in triaxial directions and angular velocities about the three axes) and movements of the respective feature quantity groups corresponding to the dashboard 31, the frames 32, the ceiling 33, and the oncoming car 25 are low. Therefore, such feature quantity groups will be subjected to processes in Step 207 and subsequent steps.

In Step 207, the control unit 1 determines whether the user who is wearing the HMD 100 is in the first mobile object. Note that, it has already been determined whether the user is in the first mobile object in the situation recognition process.

In the case where the user is in the first mobile object (Yes in Step 207), the control unit 1 measures a distance between the HMD 100 (the user) and the object corresponding to the feature quantity group that is a current determination target (Step 208). For example, it is possible to measure the distance on the basis of two pieces of image information (parallax) obtained by the two imaging units 4. Note that, the distance may be measured by a distance sensor that uses light, an acoustic wave, or the like, for example.

Next, the control unit 1 determines if the distance between the HMD 100 (the user) and the object corresponding to the feature quantity group is a threshold or less (Step 209).

In the case where the distance is the threshold or less (Yes in Step 209), the control unit 1 classifies the feature quantity group that is the current determination target, as feature quantity of the first mobile object coordinate system (Step 210).

Here, for example, distances between the HMD 100 (the user) and the respective structural elements constituting the car 30 such as the dashboard 31, the frames 32, and the ceiling 33 are short in the example illustrated in FIG. 11. Therefore, the distances between the HMD 100 and the respective structural elements constituting the car 30 such as the dashboard 31, the frames 32, and the ceiling 33 are determined to be the threshold or less (Yes in Step 209), and the feature quantity groups corresponding to them are classified as feature quantities of the first mobile object coordinate system (Step 210).

On the other hand, in the case where the distance exceeds the threshold (No in Step 209), the control unit 1 classifies the feature quantity group that is the current determination target, as feature quantity of the corresponding second mobile object coordinate system (Step 211).

Here, for example, a distance between the HMD 100 (the user) and the oncoming car 25 is long in the example illustrated in FIG. 11. Therefore, the distance to the oncoming car 25 exceeds the threshold (No in Step 209). In this case, a feature quantity group corresponding to the oncoming car 25 is classified as feature quantity of the second mobile object coordinate system corresponding to the oncoming car 25 (Step 211).

Note that, the threshold compared with the distance in Step 209 may be changed depending on the type of the mobile object that carries the user. For example, a distance between the HMD 100 and a body of the car 30 that are carrying the user is considered to be different from a distance between the HMD 100 and a body of a train 90 that is carrying the user. Therefore, for example, a threshold to be used in the case where the user is in the car 30 may be set to a smaller value than a threshold to be used in the case where the user is in the train 90.

Note that, even in the case where the user is not in the first mobile object in Step 207 (No in Step 207), the feature quantity group that is the current determination target is classified as feature quantity of the corresponding second mobile object coordinate system (Step 211) in a way similar to the case where the distance exceeds the threshold.

As an example, it is assumed that the oncoming car 25 is running while the user is walking on the sidewalk. A degree of coincidence between inertial information and movement of a feature quantity group corresponding to the oncoming car 25 is low (Yes in Step 205), and the user is not in the first mobile object (No in Step 207) at this time. In this case, the control unit 1 classifies the feature quantity group corresponding to the oncoming car 25 as feature quantity of the second mobile object coordinate system corresponding to the oncoming car 25.

After Step 206, Step 210, and Step 211, the control unit 1 determines whether classification of all the feature quantity groups is completed (Step 212).

In the case where a feature quantity group remains unclassified (No in Step 212), the control unit 1 returns to Step 202, read out the feature quantity group that remains unclassified, and performs the processes in Step 204 and subsequent steps again.

In Step 212, the control unit 1 ends the process in the case where classification of all the feature quantity groups is completed (Yes in Step 212).

Note that, in Step 201 to Step 212, the control unit 1 determines the degrees of coincidence between the inertial information and movements of the feature quantities, and determines which of the feature quantities regarding the image information is to be used for estimating the self location in each of the coordinate systems on the basis of the degrees of coincidence.

"Coordinate System Setting Process"

Figure 6:
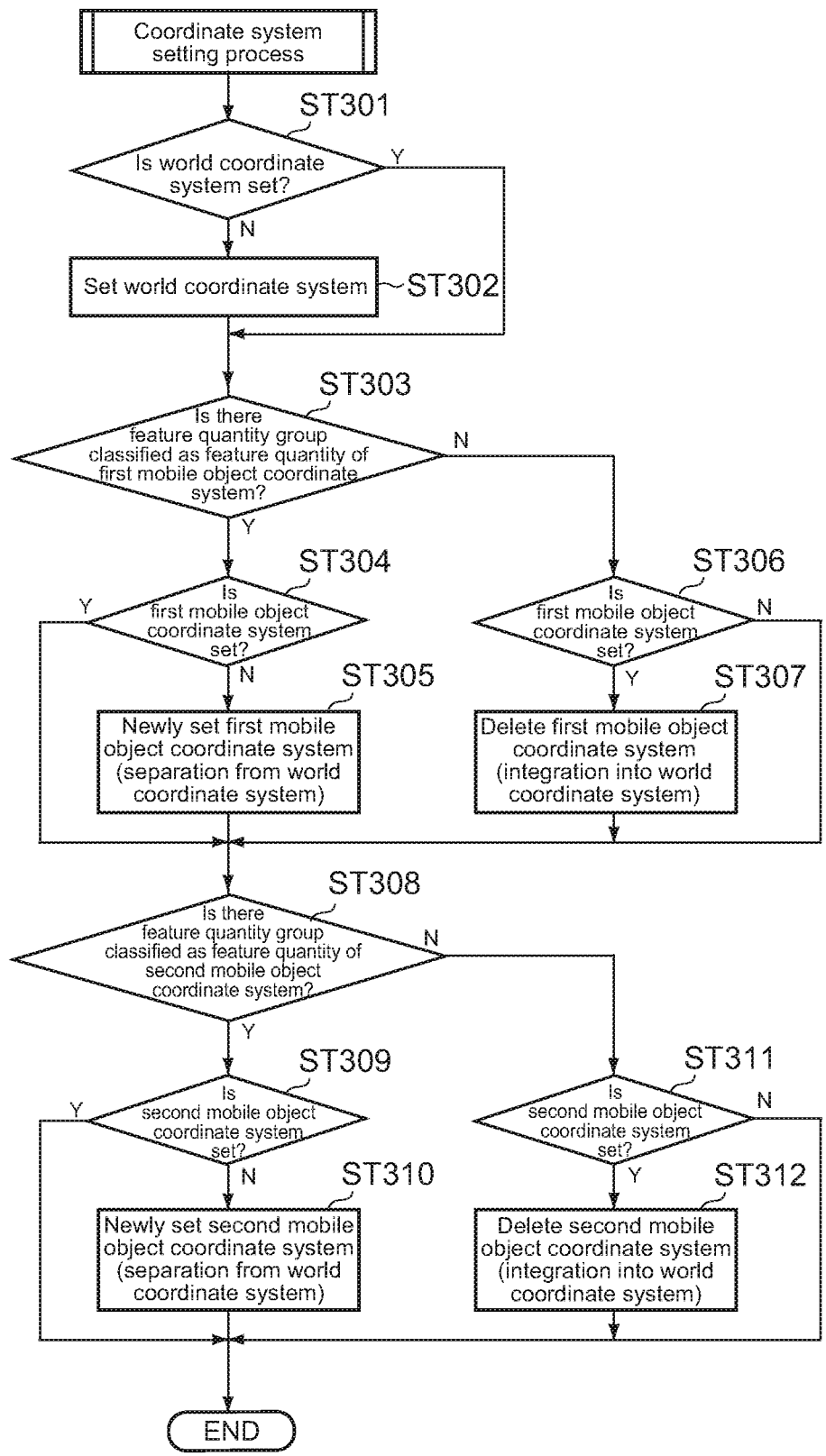
FIG. 6 is a flowchart illustrating a process performed by a control unit in a coordinate system setting process.

Next, the coordinate system setting process will be described. FIG. 6 is a flowchart illustrating a process performed by the control unit 1 in the coordinate system setting process.

The control unit 1 first determines whether the world coordinate system is set (Step 301). In the case where the world coordinate system is not set (No in Step 301), the control unit 1 sets the earth coordinate system while using a specific location on the earth as an origin (Step 302).

Next, the control unit 1 determines whether there is a feature quantity group classified as feature quantity of the first mobile object coordinate system in the feature quantity classification process performed at this time (Step 303).

In the case where there is a feature quantity group classified as feature quantity of the first mobile object coordinate system in the feature quantity classification process performed at this time (Yes in Step 304), the control unit 1 determines whether the first mobile object coordinate system is set (Step 304). In the case where the first mobile object coordinate system is not set (No in Step 304), the control unit 1 newly sets the first mobile object coordinate system while using a specific location of the first mobile object as an origin (Step 305). This makes it possible to separate the first mobile object coordinate system from the world coordinate system.

In the case where the first mobile object coordinate system has already been set in Step 304 (Yes in Step 304), the control unit 1 proceeds to next Step 308 without performing the process of newly setting the first mobile object coordinate system.

In the case where, in Step 303, there is no feature quantity group classified as feature quantity of the first mobile object coordinate system in the feature quantity classification process performed at this time (No in Step 303), the control unit 1 determines whether the first mobile object coordinate system is set (Step 306). In the case where the first mobile object coordinate system is set (Yes in Step 306), the control unit 1 deletes the first mobile object coordinate system (Step 307). This makes it possible to integrate the first mobile object coordinate system into the world coordinate system.

Note that, the control unit 1 may delete the first mobile object coordinate system when there is no feature quantity group classified as feature quantity of the first mobile object coordinate system even after a predetermined period of time (about few seconds) has elapsed since there has been no feature quantity group classified as feature quantity of the first mobile object coordinate system.

In the case where the first mobile object coordinate system is not set in Step 306 (No in Step 306), the control unit 1 proceeds to next Step 308 without performing the process of deleting the first mobile object coordinate system.

In Step 308, the control unit 1 determines whether there is a feature quantity group classified as feature quantity of the second mobile object coordinate system in the feature quantity classification process performed at this time.

In the case where there is a feature quantity group classified as feature quantity of the second mobile object coordinate system in the feature quantity classification process performed at this time (Yes in Step 308), the control unit 1 determines whether the corresponding second mobile object coordinate system is set (Step 309). In the case where the corresponding second mobile object coordinate system is not set (No in Step 309), the control unit 1 newly sets the second mobile object coordinate system while using a specific location of the second mobile object as an origin (Step 310). This makes it possible to separate the second mobile object coordinate system from the world coordinate system.

In the case where the corresponding second mobile object coordinate system has already been set in Step 309 (Yes in Step 309), the control unit 1 ends the process without performing the process of newly setting the second mobile object coordinate system.

In the case where, in Step 308, there is no feature quantity group classified as feature quantity of the second mobile object coordinate system in the feature quantity classification process performed at this time (No in Step 308), the control unit 1 determines whether the corresponding second mobile object coordinate system is set (Step 311). In the case where the corresponding second mobile object coordinate system is set (Yes in Step 311), the control unit 1 deletes the second mobile object coordinate system (Step 312). This makes it possible to integrate the corresponding second mobile object coordinate system into the world coordinate system.

Note that, the control unit 1 may delete the second mobile object coordinate system when there is no feature quantity group classified as feature quantity of the corresponding second mobile object coordinate system even after a predetermined period of time (about few seconds) has elapsed since there has been no feature quantity group classified as feature quantity of the second mobile object coordinate system.

In the case where the corresponding second mobile object coordinate system is not set in Step 311 (No in Step 311), the control unit 1 ends the process without performing the process of deleting the second mobile object coordinate system.

Next, details of the separation/integration of the first mobile object coordinate system and the second mobile object coordinate system from/into the world coordinate system will be described with reference to examples. Note that, hereinafter, the description will be given with reference to the feature quantity classification process.

For example, it is assumed that the car 30 that carries the user who is wearing the HMD 100 is at a stop in the example illustrated in FIG. 11. The car 30 belongs to the world coordinate system in the situation where the car 30 is at a stop. In other words, degrees of coincidence between inertial information and movements corresponding to the respective structural elements constituting the car 30 such as the dashboard 31, the frames 32, and the ceiling 33 are high (No in Step 205), and the feature quantity groups are classified as feature quantities of the world coordinate system (Step 206).

At this time, there is no feature quantity group classified as feature quantity of the first mobile object coordinate system. Therefore, the first mobile object coordinate system has not been set yet.

On the other hand, it is assumed that the stopped car 30 starts running, and the degrees of coincidence between the inertial information and the movements of the respective feature quantity groups corresponding to the structural elements constituting the car 30 become a threshold or less (Yes in Step 205). In this case, distances between the HMD 100 and the respective structural elements constituting the car 30 are a threshold or less (Yes in Step 209), and the feature quantity groups corresponding to the respective structural elements constituting the car 30 are classified as feature quantities of the first mobile object coordinate system (Step 210).

In this case, there are the feature quantity groups classified as the feature quantities of the first mobile object coordinate system (Yes in Step 303). In addition, at this time, the first mobile object coordinate system has not been set yet (No in Step 304). Therefore, the first mobile object coordinate system is newly set, and the first mobile object coordinate system is separated from the world coordinate system (Step 305).

On the other hand, it is assumed that the running car 30 stops (or the car 30 moves slowly before complete stop), and the degrees of coincidence between the inertial information and movements of the respective feature quantity groups corresponding to the structural elements constituting the car 30 exceed a threshold (Yes in Step 205). In this case, the feature quantity groups corresponding to the respective structural elements constituting the car 30 are classified as feature quantities of the world coordinate system (Step 206).

In this case, there is no feature quantity group classified as feature quantity of the first mobile object coordinate system (No in Step 303). In addition, at this time, the first mobile object coordinate system has already been set (Yes in Step 306). Therefore, the first mobile object coordinate system is deleted, and the first mobile object coordinate system is integrated into the world coordinate system (Step 307).

In addition, for example, it is assumed that the oncoming car 25 is at a stop in the example illustrated in FIG. 11. Note that, the car 30 that carries the user may be running or may be at a stop. In a situation where the oncoming car 25 is at a stop, the oncoming car 25 belongs to the world coordinate system. In other words, a degree of coincidence between inertial information and movement of a feature quantity group corresponding to the oncoming car 25 is high (No in Step 205), and the feature quantity group is classified as feature quantity of the world coordinate system (Step 206).

At this time, there is no feature quantity group classified as feature quantity of the second mobile object coordinate system corresponding to the oncoming car 25. Therefore, the second mobile object coordinate system corresponding to the oncoming car 25 has not been set yet.

On the other hand, it is assumed that the stopped oncoming car 25 starts running, and the degree of coincidence between the inertial information and the movement of the feature quantity group corresponding to the oncoming car 25 becomes a threshold or less (Yes in Step 205). In this case, a distance between the HMD 100 and the oncoming car 25 is a threshold or less (No in Step 209), and a feature quantity group corresponding to the oncoming car 25 is classified as feature quantity of the second mobile object coordinate system corresponding to the oncoming car 25 (Step 211).

In this case, there is the feature quantity group classified as the feature quantity of the second mobile object coordinate system (Yes in Step 308). In addition, at this time, the second mobile object coordinate system corresponding to the oncoming car 25 is not set (No in Step 309). Therefore, the second mobile object coordinate system corresponding to the oncoming car 25 is newly set, and the second mobile object coordinate system is separated from the world coordinate system (Step 310).

On the other hand, it is assumed that the running oncoming car 25 stops (or the oncoming car 25 moves slowly before complete stop), and the degree of coincidence between the inertial information and movement of the feature quantity group corresponding to the oncoming car 25 exceeds a threshold (No in Step 205). In this case, the feature quantity group corresponding to the oncoming car 25 is classified as feature quantity of the world coordinate system (Step 206).

In this case, there is no feature quantity group classified as feature quantity of the second mobile object coordinate system corresponding to the oncoming car 25 (No in Step 308). In addition, at this time, the second mobile object coordinate system corresponding to the oncoming car 25 has already been set (Yes in Step 311). Therefore, the second mobile object coordinate system corresponding to the oncoming car 25 is deleted, and the second mobile object coordinate system is integrated into the world coordinate system (Step 312).

"Self Location Estimation Process"

Figure 7:
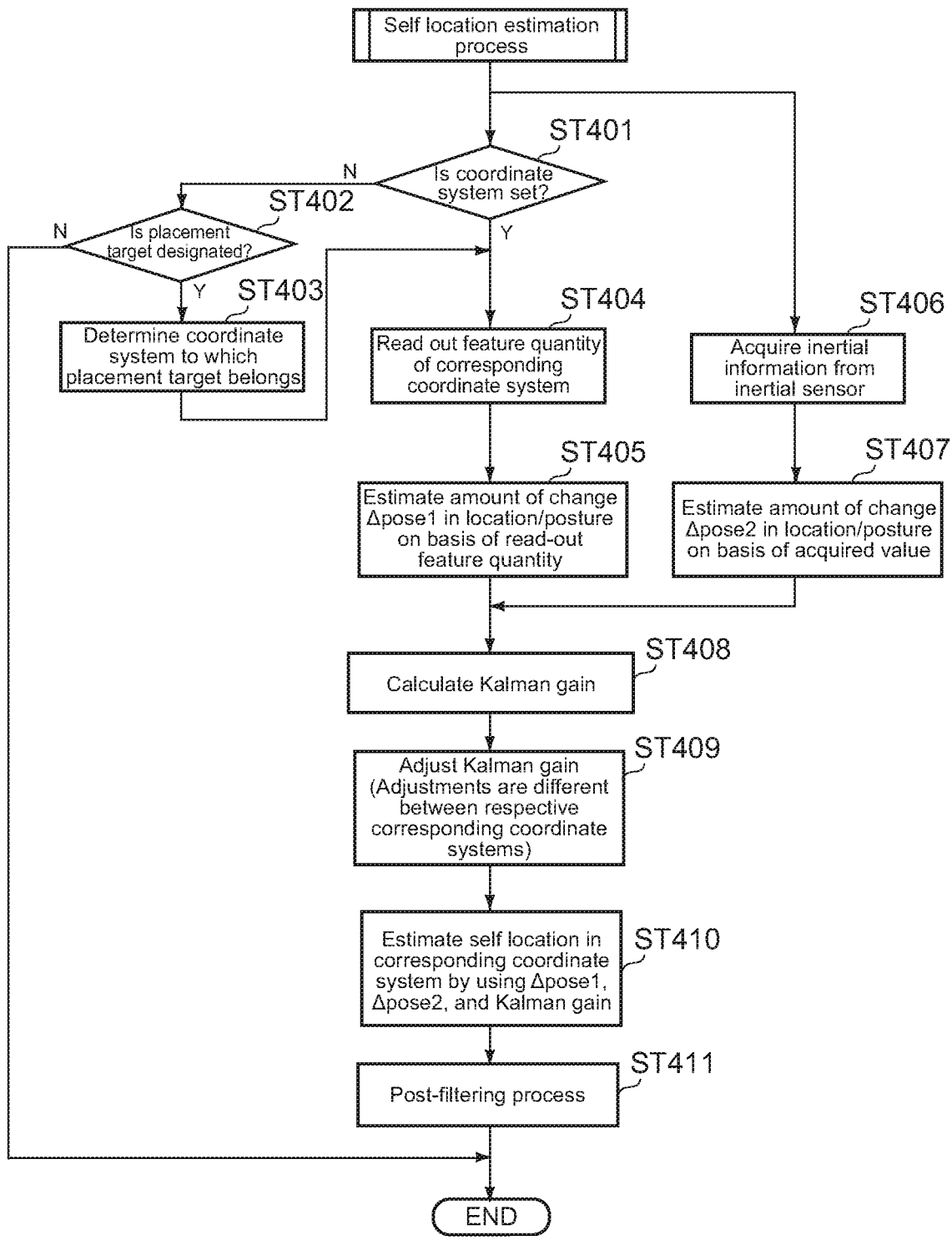
FIG. 7 is a flowchart illustrating a process performed by the control unit in a self location estimation process.

Next, a self location (including self posture) estimation process performed by the control unit 1 will be described. FIG. 7 is a flowchart illustrating a process performed by the control unit 1 in the self location estimation process.

The control unit 1 first determines whether a coordinate system for placing a virtual object 20 is designated (Step 401). For example, the coordinate system is designated for each application. In addition, sometimes different coordinate systems may be designated for respective applications.

The designation of a coordinate system includes two patterns. A first designation pattern is a pattern in which only one of the world coordinate system, the first mobile object coordinate system, or the second mobile object coordinate system is decided to be used.

With reference to FIG. 10, it is assumed that the arrow virtual object 20b for route guidance and the virtual object 20c including information regarding the building are placed. An application related to such virtual objects 20 uses a designation pattern in which the world coordinate system is always used.

A second designation pattern is a pattern in which a priority coordinate system is used in the case where there is the priority coordinate system, and another coordinate system is used in the case where there is no coordinate system corresponding to the priority coordinate system. For example, the first mobile object coordinate system is used in the case where there is the first mobile object coordinate system, and the earth coordinate system is used in the case where there is no first mobile object coordinate system.

With reference to FIG. 10, it is assumed that the virtual object 20a of news is placed. For example, a coordinate system is designated in a designation pattern in which an application related to such a virtual object 20 uses the first mobile object coordinate system in the case where there is the first mobile object coordinate system, and the application uses the earth coordinate system in the case where there is no first mobile object coordinate system.

In the case where the coordinate system is not designated (No in Step 401), the control unit 1 determines whether a placement target above which the virtual object 20 is to be placed is designated by the application (Step 402). In the case where the placement target above which the virtual object 20 is to be placed is designated (Yes in Step 402), the control unit 1 determines which coordinate system the placement target belongs to (Step 403).

For example, with reference to FIG. 10, it is assumed that the road 21, the building 22, and the like are designated as the placement targets of the virtual objects 20. In this case, the control unit 1 determines which coordinate system the road 21 and the building 22 belong to. It is possible to make such a determination by determining which coordinate system the feature quantity groups corresponding to the road 21 and the building 22 are classified into (see Step 206, Step 210, and Step 211). Note that, in this case, it is determined that the road 21 and the building 22 belong to the world coordinate system.

In addition, with reference to FIG. 10, it is assumed that the dashboard 31 of the car 30 is designated as a placement target of a virtual object 20, for example. In this case, the control unit 1 determines which coordinate system the dashboard 31 belongs to. It is possible to make such a determination by determining which coordinate system the feature quantity group corresponding to the dashboard 31 is classified into (see Step 206, Step 210, and Step 211). Note that, in this case, it is determined that the dashboard 31 belongs to the world coordinate system if the car 30 is at a stop. It is determined that the dashboard 31 belongs to the first mobile object coordinate system if the car 30 is running.

Figure 12:
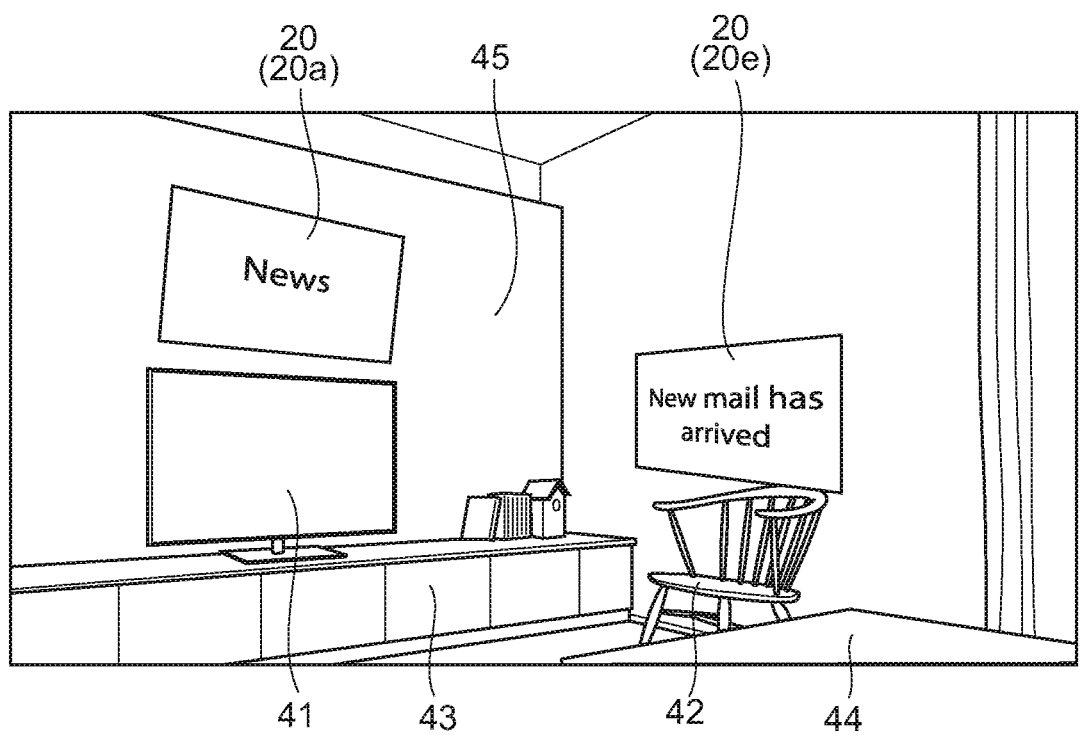
FIG. 12 is a diagram illustrating an example of a field of view seen by a user while the user is in a living room.

In addition, with reference to FIG. 12, it is assumed that the oncoming car 25 is designated as a placement target of a virtual object 20, for example. In this case, the control unit 1 determines which coordinate system the oncoming car 25 belong to. It is possible to make such a determination by determining which coordinate system the feature quantity group corresponding to the oncoming car 25 is classified into (see Step 206, Step 210, and Step 211). Note that, it is determined that the oncoming car 25 belongs to the world coordinate system if the oncoming car 25 is at a stop. It is determined that the oncoming car 25 belongs to the second mobile object coordinate system if the oncoming car 25 is running.

Note that, it is also possible for the user to designate the placement targets instead of the application. For example, when the user provides a specific input (a gesture input via the imaging units 4, a sound input via the microphone 7, or an operation input via the operation unit 6), the input is detected and a placement target is designated. For example, when the user reaches his/her hand for the dashboard 31 and performs a specific gesture operation while the hand is captured by the imaging units 4, the dashboard 31 is designated as a placement target of the virtual object 20a of news.

In the case where the coordinate system is not designated (No in Step 401) and also the placement target is not designated (No in Step 402), the control unit 1 ends the process.

The control unit 1 proceeds to next Step 404 in the case where the coordinate system is designated (Yes in Step 401), the placement target is designated (Step 402), and a coordinate system to which the placement target belong is determined (Step 403). In Step 404, the control unit 1 reads out feature quantity of the corresponding coordinate system.

Next, the control unit 1 calculates an amount of change Δpose1 in the location/posture on the basis of the read-out feature quantity.

Note that, as understood from the above description, feature quantity of the world coordinate system is used for estimating a self location in the world coordinate system, and feature quantities of the first mobile object coordinate system and the second mobile object coordinate system are not used. In a similar way, feature quantity of the first mobile object coordinate system is used for estimating a self location in the first mobile object world coordinate system, and feature quantities of the world coordinate system and the second mobile object coordinate system are not used. In a similar way, feature quantity of the second mobile object coordinate system is used for estimating a self location in the second mobile object coordinate system, and feature quantities of the world coordinate system and the first mobile object coordinate system are not used.

The control unit 1 calculates Δpose2 on the basis of inertial information in Step 406 and Step 407 simultaneously with calculation of Δpose1 based on feature quantity in the image information in Step 404 and Step 405.

Specifically, the control unit 1 acquires the inertial information at this time from the inertial sensor 5 (Step 406), and calculates an amount of change in location/posture on the basis of the acquired information (Step 407).

Next, the control unit 1 calculates Kalman gain on the basis of a covariance matrix (Step 408). Note that, according to the present embodiment, a process based on the Kalman filtering process is performed for estimating a self location. Typically, an extended Kalman filter (EKF) is used as a Kalman filter. It is also possible to use an unscented Kalman filter (UKF).

The Kalman gain of the Kalman filtering process is, so to speak, a ratio of reliability between Δpose1 and Δpose2 that are to be used for estimating the self location. Δpose1 is calculated on the basis of feature quantity of the image information. $\Delta$pose2 is calculated on the basis of the inertial information.

After the Kalman gain is calculated, the control unit 1 changes the Kalman gain in accordance with the corresponding coordinate system (Step 409). In other words, according to the present embodiment, the control unit 1 changes the ratio based on the Kalman gain depending on a coordinate system to be used and various situations of the user such as whether the user is in the first mobile object.

In Step 409, for example, the control unit 1 does not change the Kalman gain and uses a value of the Kalman gain as it is in the case of estimating a self location in the world coordinate system.

On the other hand, in the case of estimating a self location in the first mobile object coordinate system, the control unit 1 changes the Kalman gain in such a manner that $\Delta$pose1 based on the image information is to be used more reliably.

Note that, in the case of estimating the self location in the first mobile object coordinate system according to the present embodiment, $\Delta$pose2 having low reliability is not trusted at all, and $\Delta$pose2 is not reflected in the estimation of the self location at all (that is, $\Delta$pose2 is ignored). In other words, when estimating the self location in the first mobile object coordinate system, the control unit 1 changes the Kalman gain in such a manner that only $\Delta$pose1 based on the image information is reliably used among $\Delta$pose1 based on the image information and $\Delta$pose2 based on the inertial information.

In addition, when estimating a self location in the second mobile object coordinate system, the control unit 1 also changes the Kalman gain in such a manner that $\Delta$pose1 based on the image information is to be used more reliably in a way similar to the first mobile object coordinate system.

When estimating the self location in the second mobile object coordinate system according to the present embodiment, $\Delta$pose2 having low reliability is not trusted at all, and $\Delta$pose2 is not reflected in the estimation of the self location at all (that is, $\Delta$pose2 is ignored) in a way similar to the first mobile object coordinate system. In other words, when estimating the self location in the second mobile object coordinate system, the control unit 1 changes the Kalman gain in such a manner that only $\Delta$pose1 based on the image information is reliably used among $\Delta$pose1 based on the image information and $\Delta$pose2 based on the inertial information.

Next, the control unit 1 estimates the self location in the corresponding coordinate system by using $\Delta$pose1 based on the image information, $\Delta$pose2 based on the inertial information, and the Kalman gain (Step 410).

Note that, according to the present embodiment, it is possible to estimate a self location in the world coordinate system, estimate a self location in the first mobile object coordinate system, and estimate a self location in the second mobile object coordinate system at the same time.

When estimating the self location in the second mobile object coordinate system, it is also possible to estimate the self location in view of location information (for example, Global Positioning System (GPS) information) as long as it is possible to acquire the location information from the second mobile object (for example, the oncoming car 25). In addition, at this time, it is also possible to consider positional information (such as GPS information) of the HMD 100.

In addition, when estimating a self location in the first mobile object coordinate system and the second mobile object coordinate system, it is also possible to use a value of the inertial information based on the world coordinate system after transforming the value into values corresponding to the first mobile object coordinate system and the second mobile object coordinate system.

Next, the control unit 1 performs a post-filtering process such as delay compensation or noise reduction (Step 411), and end the process.

Note that, the delay compensation is performed for compensating delay based on calculation time of the self location estimation process (in particular, an image process). This delay compensation is performed on the basis of the inertial information. On the other hand, the inertial information has low reliability in the first mobile object coordinate system and the second mobile object coordinate system. Therefore, in this case, the delay compensation based on the inertial information does not have to be performed. Note that, in the case of the world coordinate system, the delay compensation based on the inertial information is performed as usual.

Note that, in the delay compensation, it is also possible to use a value obtained by transforming the inertial information (a value based on the world coordinate system) into a value of the first mobile object coordinate system or the second mobile object coordinate system. On the other hand, delay based on calculation time occurs when the coordinate transformation is performed on the value of the inertial information. Accordingly, it is also possible to make a prediction to compensate for the delay.

In addition, it is also possible to smooth the movement of the virtual object 20 through post-filtering in the case where a variance value in the Kalman filter gets larger with regard to each coordinate system (in the case where self location estimation has low accuracy).

"Self Location Recalculation Process"

Figure 8:
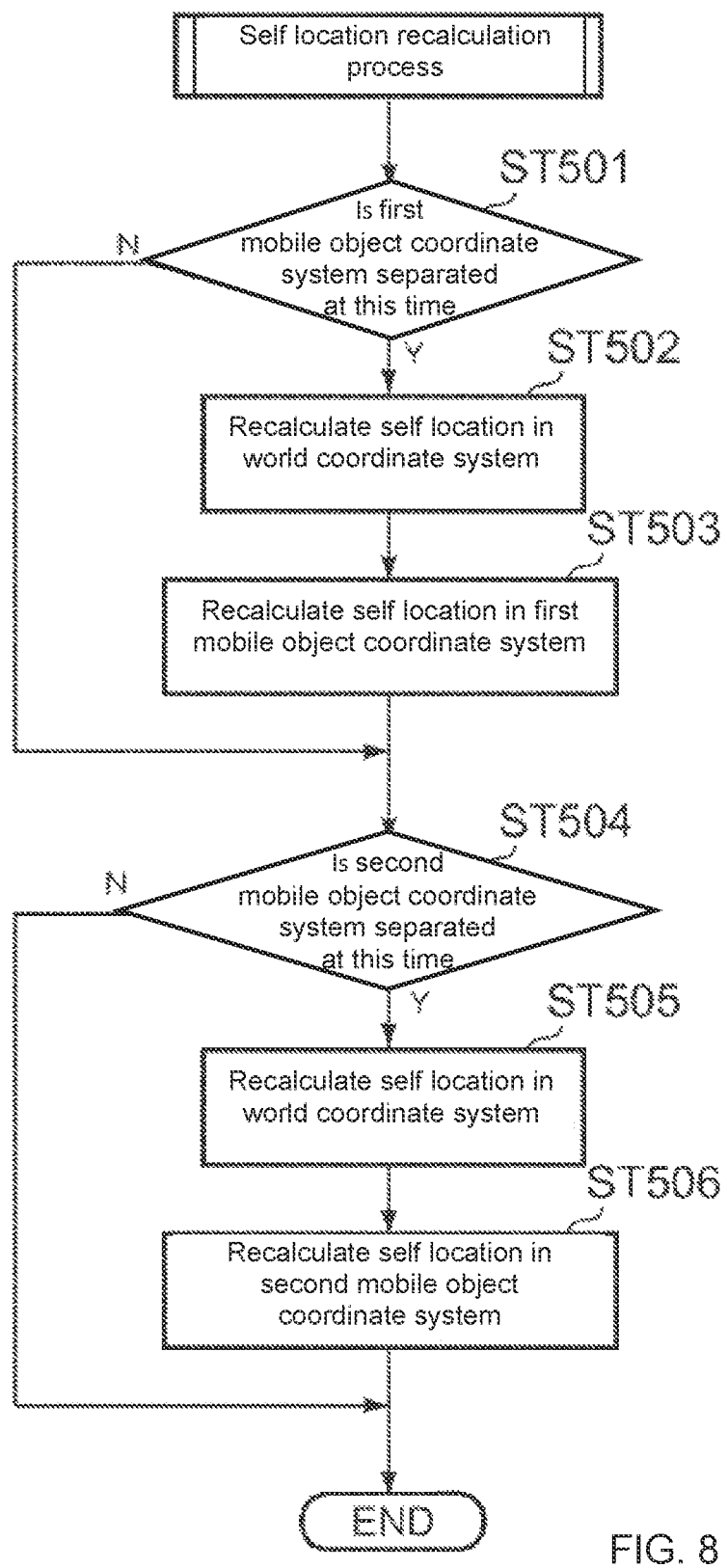
FIG. 8 is a flowchart illustrating a process performed by the control unit in a self location recalculation process.

Next, the self location recalculation process will be described. FIG. 8 is a flowchart illustrating a process performed by the control unit 1 in the self location recalculation process.

Here, reasons for performing the self location recalculation process will be described first.

As described above, when the car 30 (the first mobile object) that is carrying the user is at a stop, the feature quantity groups corresponding to the respective structural elements of the car 30 such as the dashboard 31 are classified as feature quantities of the world coordinate system (Step 206). Next, the feature quantity groups corresponding to the respective structural elements of the car 30 are used as feature quantities for estimating a self location in the world coordinate system (Step 404 and Step 405).

On the other hand, when the stopped car 30 starts running and the degrees of coincidence between the inertial information and movements of the respective feature quantity groups corresponding to the structural elements of the car 30 become a threshold or less (Yes in Step 205), the feature quantity groups corresponding to the respective structural elements of the car 30 are classified into the first mobile object coordinate system (Step 210). Next, the first mobile object coordinate system is separated from the world coordinate system (Step 305).

Here, a period from when the stopped car 30 starts running to when the degrees of coincidence become the threshold or less will be described. In this period, the feature quantity groups corresponding to the respective structural elements of the car 30 such as the dashboard 31 are classified as feature quantities of the world coordinate system (Step 206), and are used as the feature quantities for estimating a self location in the world coordinate system (Step 404 and Step 405).

In other words, in the above-described period, the feature quantity groups of the respective structural elements of the car 30 that is moving relative to the world coordinate system are used as feature quantities for estimating the self location in the world coordinate system. Therefore, in this period, estimation of the self location in the world coordinate system has low accuracy.

In addition, from a viewpoint of the accuracy of self location estimation in the first mobile object coordinate system, the feature quantity groups of the respective structural elements of the car 30 classified into the world coordinate system in the above-described period should be used as feature quantities for estimating a self location in the first mobile object coordinate system in a usual case.

In addition, the same applies to the case where the stopped oncoming car 25 starts running and the second mobile object coordinate system is separated from the world coordinate system. In other words, in a period from when the stopped oncoming car 25 starts running to when the degree of coincidence becomes a threshold or less, the feature quantity group corresponding to the oncoming car 25 that is moving relative to the world coordinate system is used as feature quantity for estimating the self location in the world coordinate system. In this case, estimation of the self location in the world coordinate system also has low accuracy in a similar way.

In addition, from a viewpoint of the accuracy of self location estimation in the second mobile object coordinate system, the feature quantity group of the oncoming car 25 classified into the world coordinate system in the above-described period should be used as feature quantity for estimating a self location in the second mobile object coordinate system in a usual case.

Therefore, according to the present embodiment, a self location recalculation process illustrated in FIG. 8 is performed.

The control unit 1 first determines whether the first mobile object coordinate system is separated from the earth coordinate system at this time (Step 501) (see Step 305).

In the case where the first mobile object coordinate system is separated from the world coordinate system (Yes in Step 501), the control unit 1 recalculates a self location retroactive to a predetermined time before a timing at which the separation has occurred (retroactive to a timing at which the car 30 has started running), in estimation of the self location in the world coordinate system (Step 502). At this time, the control unit 1 excludes feature quantity groups whose degrees of coincidence obtained at the time of separation are a threshold or less (in other words, feature quantity groups corresponding to the respective structural elements of the car 30) retroactive to the predetermined time before the timing at which the separation has occurred, and then recalculates estimation of the self location.

In addition, in the case where the first mobile object coordinate system is separated from the world coordinate system, the control unit 1 recalculates a self location retroactive to a predetermined time before a timing at which the separation has occurred (retroactive to a timing at which the car 30 has started running), in estimation of the self location in the first mobile object coordinate system (Step 503). At this time, the control unit 1 recalculates estimation of the self location by using feature quantity groups whose degrees of coincidence obtained at the time of separation are a threshold or less (in other words, feature quantity groups corresponding to the respective structural elements of the car 30) retroactive to the predetermined time before the timing at which the separation has occurred.

Next, the control unit 1 determines whether the second mobile object coordinate system is separated from the earth coordinate system at this time (Step 504) (see Step 310).

In the case where the second mobile object coordinate system is separated from the world coordinate system (Yes in Step 504), the control unit 1 recalculates a self location retroactive to a predetermined time before a timing at which the separation has occurred (retroactive to a timing at which the oncoming car 25 has started running), in estimation of the self location in the world coordinate system (Step 505). At this time, the control unit 1 excludes a feature quantity group whose degree of coincidence obtained at the time of separation is a threshold or less (in other words, the feature quantity group corresponding to the oncoming car 25) retroactive to the predetermined time before the timing at which the separation has occurred, and then recalculates a self location.

In addition, in the case where the second mobile object coordinate system is separated from the world coordinate system, the control unit 1 recalculates a self location retroactive to a predetermined time before a timing at which the separation has occurred (retroactive to a timing at which the oncoming car 25 has started running), in estimation of the self location in the second mobile object coordinate system (Step 506). At this time, the control unit 1 recalculates a self location by using the feature quantity group whose degree of coincidence obtained at the time of separation is a threshold or less (in other words, the feature quantity group corresponding to the oncoming car 25) retroactive to the predetermined time before the timing at which the separation has occurred.

"Virtual Object Placement Process"

Figure 9:
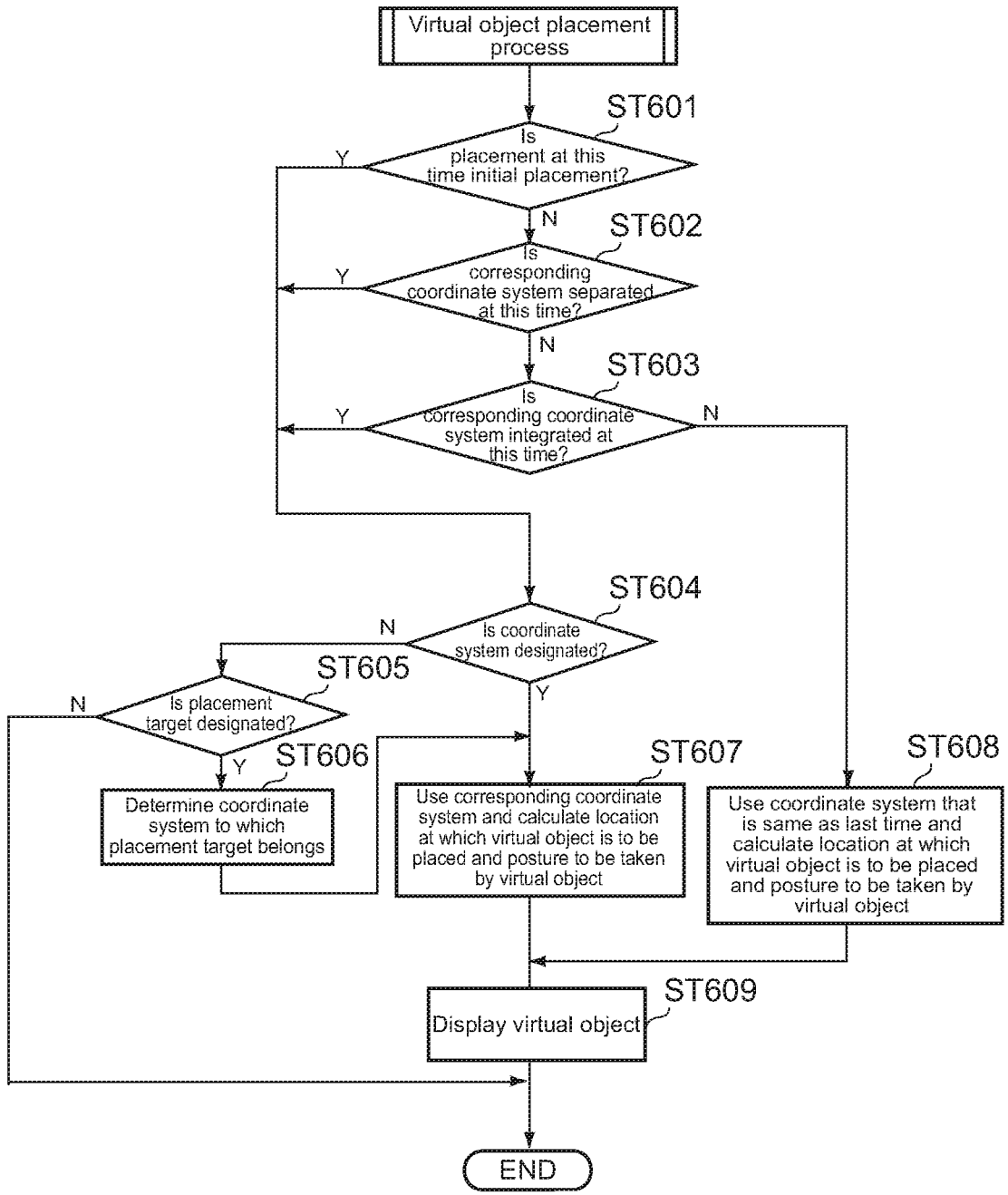
FIG. 9 is a flowchart illustrating a process performed by a control unit in a virtual object placement process.

Next, a process in which the control unit 1 places the virtual object 20 on a real object in a real world with regard to each coordinate system will be described. FIG. 9 is a flowchart illustrating the virtual object placement process.

The control unit 1 first determines whether placement at this time is initial placement of the virtual object 20 (Step 601). In the case of the initial placement of the virtual object (Yes in Step 601), the control unit 1 proceeds to Step 604.

On the other hand, in the case where the virtual object 20 has already been placed (No in Step 601), the control unit 1 determines whether a corresponding coordinate system is separated from the earth coordinate system at this time (Step 602) (see Step 305 and Step 310).

In the case where the corresponding coordinate system is separated from the earth coordinate system (Yes in Step 602), the control unit 1 proceeds to next Step 604. On the other hand, in the case where the corresponding coordinate system is not separated from the earth coordinate system (No in Step 602), the control unit 1 determines whether the corresponding coordinate system is integrated into the earth coordinate system at this time (Step 603) (see Step 307 and Step 312).

In the case where the corresponding coordinate system is integrated into the earth coordinate system (Yes in Step 603), the control unit 1 proceeds to next Step 604.

In Step 604, the control unit 1 determines whether a coordinate system is designated.

As described above, the designation of a coordinate system includes two patterns. A first designation pattern is a pattern in which only one of the world coordinate system, the first mobile object coordinate system, or the second mobile object coordinate system is decided to be used. A second designation pattern is a pattern in which a priority coordinate system is used in the case where there is the priority coordinate system, and another coordinate system is used in the case where there is no coordinate system corresponding to the priority coordinate system.

In the case where the coordinate system is not designated (No in Step 604), the control unit 1 determines whether a placement target of the virtual object 20 is designated (Step 605). In the case where the placement target is designated (Yes in Step 605), the control unit 1 determines which coordinate system the placement target belongs to (Step 606).

In the case where the coordinate system is not designated (No in Step 604) and also the placement target is not designated (No in Step 605), the control unit 1 ends the process.

Note that, in Step 604 to Step 606, processes that are basically similar to the above-described Steps 401 to 403 are performed.

The control unit 1 proceeds to next Step 607 in the case where the coordinate system is designated (Yes in Step 604), or in the case where the placement target is designated and the coordinate system to which the placement target belong is determined (Step 606). In Step 607, the control unit 1 uses the corresponding coordinate system (the self location in the coordinate system) and calculates a location at which the virtual object 20 is to be placed and a posture to be taken by the virtual object 20.

Next, the control unit 1 displays the virtual object 20 in such a manner that the virtual object 20 overlaps the placement target and the user can see the virtual object 20 with the calculated posture at the calculated location (Step 609). Note that, information such as a text, diagram, sign, and the like included in the virtual object 20 may be received via a network when needed or may be stored in the storage unit 2 in advance.

At this time, the control unit 1 proceeds to Step 608 in the case where the placement is not the initial placement of the virtual object 20, the corresponding coordinate system is not separated, and the corresponding coordinate system is not integrated (No in Step 603). In Step 608, the control unit 1 the control unit 1 uses the coordinate system (the self location in the coordinate system) that is the same as the last time and calculates a location at which the virtual object 20 is to be placed and a posture to be taken by the virtual object 20. Next, the control unit 1 instructs the display unit 3 to display the virtual object 20 (Step 609).

Note that, Once the virtual object 20 is initially placed, it is possible to calculate a location at which the virtual object 20 is to be placed and a posture to be taken by the virtual object 20 until a deletion timing of the virtual object 20 even when the virtual object 20 (the placement target) goes out of the image (the field of view). In addition, the virtual object 20 is displayed as long as the user is seeing the direction of the virtual object 20. However, the virtual object 20 is not displayed while the user is seeing a different direction from the virtual object 20.

As an example, with reference to FIG. 10, a case of initially placing virtual objects 20 above the road 21 and near the building 22 will be described. Note that, the car 30 that carries the user may be at a stop or may be running.

For example, the arrow virtual object 20*b* for route guidance is initially placed above the road 21 at a timing at which driving starts (Yes in Step 601) (the arrow virtual object 20*b* is deleted at a timing at which the driving ends), for example. Alternatively, the virtual object 20*b* is initially placed above the road 21 at a predetermined timing at which route guidance is necessary (Yes in Step 601) (the arrow virtual object 20*b* is deleted after the timing).

In addition, the virtual object 20*c* including information regarding the building is initially placed near the building 22 at a timing at which a distance between the HMD 100 (the user) and the building 22 becomes a predetermined threshold or less (Yes in Step 601) (the virtual object 20*c* is deleted at a timing at which the distance to the building exceeds the predetermined threshold).

Note that, in this example, it is assumed that the coordinate system is designated in the pattern of always using the world coordinate system (Yes in Step 604).

In this case, the control unit 1 calculates (initial) locations at which the virtual objects 20 are to be placed and (initial) postures to be taken by the virtual objects 20 by using the world coordinate system (Step 607), and causes the display unit 3 to display the virtual objects 20 (Step 609).

After the virtual objects 20 are initially placed, the control unit 1 calculates locations at which the virtual objects 20 are to be placed and postures to be taken by the virtual objects 20 by using the world coordinate system that is the same as the last time (Step 608).

Next, with reference to FIG. 10, a case of initially placing the virtual object 20*a* regarding news above the dashboard 31 will be described.

For example, the virtual object 20*a* regarding news is initially placed above the dashboard 31 at a timing at which an instruction is received from the user. For example, the virtual object 20 is initially placed above the dashboard 31 when the user points to the dashboard 31 (gesture input) and the dashboard 31 of the car 30 is designated as a placement target of the virtual object 20.

First, it is assumed that the virtual object 20*a* is initially placed in a state where the car 30 is at a stop (Yes in Step 601). At this time, the control unit 1 determines that the dashboard 31 serving as the placement target belongs to the world coordinate system (Step 605 to Step 606), and calculates a (initial) location at which the virtual object 20*a* is to be placed and a (initial) posture to be taken by the virtual object 20*a* by using the world coordinate system (Step 607).

After the virtual object 20*a* is initially placed, the control unit 1 calculates a location at which the virtual object 20*a* is to be placed and a posture to be taken by the virtual object 20*a* by using the world coordinate system that is the same as the last time as long as the car 30 maintains its stopped state (Step 608).

Next, it is assumed that the virtual object 20*a* is initially placed in a state where the car 30 that carries the user is running (Yes in Step 601). In this case, the control unit 1 determines that the dashboard 31 serving the placement target belongs to the first mobile object coordinate system (Step 605 to Step 606), and calculates a (initial) location at which the virtual object 20 is to be placed and a (initial) posture to be taken by the virtual object 20 by using the first mobile object coordinate system.

After the virtual object 20 is initially placed, the control unit 1 calculates a location at which the virtual object 20 is to be placed and a posture to be taken by the virtual object 20 by using the first mobile object coordinate system that is the same as the last time as long as the car 30 maintains its running state (Step 608).

Next, with reference to FIG. 10, a case of initially placing the virtual object 20*d* including information regarding an oncoming car above the oncoming car 25 will be described. Note that, the car 30 that carries the user may be at a stop or may be running.

The virtual object 20*d* including information regarding the oncoming car is initially placed above the oncoming car 25 at a timing at which a distance between the HMD 100 (the user) and the oncoming car 25 becomes a predetermined threshold or less (the virtual object 20*d* is deleted at a timing at which the distance to the oncoming car 25 exceeds the predetermined threshold). Note that, it is assumed that the oncoming car 25 is designated as a placement target of the virtual object 20.

First, it is assumed that the virtual object 20*d* is initially placed in a state where the oncoming car 25 is at a stop (Yes in Step 601). In this case, it is determined that a coordinate system to which the oncoming car 25 that is the placement target of the virtual object 20*d* belongs is the world coordinate system (Step 605 to Step 606). In this case, the control unit 1 calculates a (initial) location at which the virtual object 20*d* is to be placed and a posture to be taken by the virtual object 20*d* by using the world coordinate system (Step 607).

After the virtual object 20 is initially placed, the control unit 1 calculates a location at which the virtual object 20*d* is to be placed and a posture to be taken by the virtual object 20*d* by using the world coordinate system that is the same as the last time as long as the oncoming car 25 maintains its stopped state (Step 608).

Next, it is assumed that the virtual object 20*d* is initially placed in a state where the oncoming car 25 is running (Yes in Step 601). In this case, it is determined that a coordinate system to which the oncoming car 25 serving as the placement target of the virtual object 20*d* belongs is the second mobile object coordinate system corresponding to the oncoming car 25 (Step 605 to Step 606). In this case, the control unit 1 calculates a (initial) location at which the virtual object 20 is to be placed and a posture to be taken by the virtual object 20 by using the second mobile object coordinate system corresponding to the oncoming car 25 (Step 607).

After the virtual object 20 is initially placed, the control unit 1 calculates a location at which the virtual object 20 is to be placed and a posture to be taken by the virtual object 20 by using the second mobile object coordinate system that is the same as the last time as long as the oncoming car 25 maintains its running state (Step 608).

Next, with reference to FIG. 10, a case where the stopped car 30 starts running in a state where the virtual object 20*a* regarding news has already been placed above the dashboard 31 will be described.

When the stopped car 30 starts running and the degrees of coincidence between the inertial information and movements of the respective feature quantity groups corresponding to the structural elements of the car 30 become a threshold or less (Yes in Step 205), the feature quantity groups corresponding to the respective structural elements of the car 30 are classified into the first mobile object coordinate system (Step 210). Accordingly, the first mobile object coordinate system is separated from the world coordinate system at this time (Yes in Step 602) (see Step 305).

In this case, it is determined that a coordinate system to which the dashboard 31 serving as the placement target of the virtual object 20 belongs is the first mobile object coordinate system (Step 605 to Step 606). Next, the control unit 1 calculates a (initial) location at which the virtual object 20 is to be placed and a posture to be taken by the virtual object 20 by using the first mobile object coordinate system (Step 607). In other words, the control unit 1 switches a coordinate system to be used from the world coordinate system to the first mobile object coordinate system when the stopped car 30 starts running.

Note that, after the first mobile object coordinate system is separated from the world coordinate system, the control unit 1 calculates a location at which the virtual object 20 is to be placed and a posture to be taken by the virtual object 20 by using the first mobile object coordinate system that is the same as the last time as long as the car 30 maintains its running state (Step 608).

Next, with reference to FIG. 10, a case where the stopped oncoming car 25 starts running in a state where the virtual object 20*d* of the oncoming car 25 has already been placed above the oncoming car 25 will be described. Note that, the car 30 that carries the user may be at a stop or may be running.

When the stopped oncoming car 25 starts running and the degree of coincidence between the inertial information and movement of the feature quantity group corresponding to the oncoming car 25 becomes a threshold or less (Yes in Step 205), the feature quantity group corresponding to the oncoming car 25 is classified into the second mobile object coordinate system (Step 210). Accordingly, the second mobile object coordinate system corresponding to the oncoming car 25 is separated from the world coordinate system at this time (Yes in Step 602) (see Step 310).

In this case, it is determined that a coordinate system to which the oncoming car 25 serving as the placement target of the virtual object 20*d* belongs is the second mobile object coordinate system corresponding to the oncoming car 25 (Step 605 to Step 606). Next, the control unit 1 calculates a location at which the virtual object 20 is to be placed and a posture to be taken by the virtual object 20 by using the second mobile object coordinate system corresponding to the oncoming car 25 (Step 607). In other words, the control unit 1 switches a coordinate system to be used from the world coordinate system to the second mobile object coordinate system when the stopped oncoming car 25 starts running.

Note that, after the second mobile object coordinate system is separated from the world coordinate system, the control unit 1 calculates a location at which the virtual object 20 is to be placed and a posture to be taken by the virtual object 20 by using the second mobile object coordinate system that is the same as the last time as long as the oncoming car 25 maintains its running state (Step 608).

Next, with reference to FIG. 10, a case where the running car 30 stops in a state where the virtual object 20*a* regarding news has already been placed above the dashboard 31 will be described.

When the running car 30 stops and the degrees of coincidence between the inertial information and movements of the respective feature quantity groups corresponding to the structural elements of the car 30 exceed a threshold (No in Step 205), the feature quantity groups corresponding to the respective structural elements of the car 30 are classified into the world coordinate system (Step 206). Accordingly, the first mobile object coordinate system is integrated into the world coordinate system at this time (Yes in Step 603) (see Step 307).

In this case, it is determined that a coordinate system to which the dashboard 31 serving as the placement target of the virtual object 20*a* belongs is the world coordinate system (Step 605 to Step 606). In this case, the control unit 1 calculates a location at which the virtual object 20*a* is to be placed and a posture to be taken by the virtual object 20*a* by using the world coordinate system (Step 607). In other words, the control unit 1 switches a coordinate system to be used from the first mobile object coordinate system to the world coordinate system when the running car 30 stops.

Note that, after the first mobile object coordinate system is integrated into the world coordinate system, the control unit 1 calculates a location at which the virtual object 20a is to be placed and a posture to be taken by the virtual object 20a by using the world coordinate system that is the same as the last time as long as the car 30 maintains its stopped state (Step 608).

Next, with reference to FIG. 10, a case where the running oncoming car 25 stops in a state where the virtual object 20d including information regarding the oncoming car 25 has already been placed above the oncoming car 25 will be described. Note that, the car 30 that carries the user may be at a stop or may be running.

When the running oncoming car 25 stops and the degree of coincidence between the inertial information and movement of the feature quantity group corresponding to the oncoming car 25 exceeds a threshold (No in Step 205), the feature quantity group corresponding to the oncoming car 25 is classified into the world coordinate system (Step 206). Accordingly, the second mobile object coordinate system corresponding to the oncoming car 25 is integrated into the world coordinate system at this time (Yes in Step 603) (see Step 312).

In this case, the control unit 1 determines that the oncoming car 25 serving as the placement target of the virtual object 20 belongs to the world coordinate system (Step 605 to Step 606), and calculates a location at which the virtual object 20d is to be placed and a posture to be taken by the virtual object 20d by using the world coordinate system (Step 607). In other words, the control unit 1 switches a coordinate system to be used from the second mobile object coordinate system to the world coordinate system when the running oncoming car 25 stops.

Note that, after the second mobile object coordinate system is integrated into the world coordinate system, the control unit 1 calculates a location at which the virtual object 20d is to be placed and a posture to be taken by the virtual object 20d by using the world coordinate system that is the same as the last time as long as the oncoming car 25 maintains its stopped state (Step 608).

Application Example 1

(Living Room)

Next, an application example of the present technology will be described. First, a case where virtual objects 20 are placed in a living room will be described.

Figure 13:
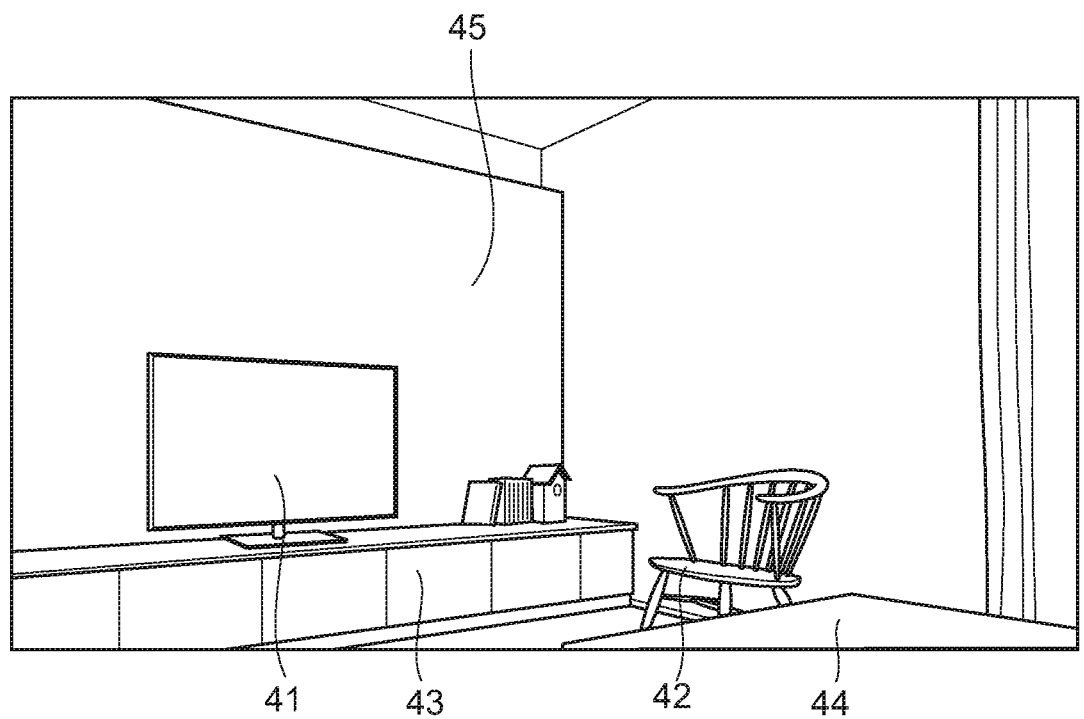
FIG. 13 is a diagram illustrating an example of image information captured by the imaging units while the user is in the living room.

FIG. 12 is a diagram illustrating an example of a field of view seen by a user while the user is in the living room. FIG. 13 is a diagram illustrating an example of image information captured by the imaging units 4 while the user is in the living room.

In FIG. 12, the virtual object 20a including information regarding news is placed above a television 41, and a virtual object 20e including information regarding email is placed above a chair 42 of the user. Note that, with regard to the virtual object 20e of the email, virtual objects 20e for respective family members may be placed above individual chairs 42 of the respective family members.

For example, it is assumed that the user who is wearing the HMD 100 is standing in the living room and seeing the direction toward the television 41 and the chair 42.

In this case, a situation of the user is first recognized on the basis of inertial information and image information in the state recognition process (Step 101 to Step 104). In this case, it is determined at least whether or not the user is in the first mobile object. In this case, it is determined that the user is not in the mobile object.

Next, in the feature quantity classification process, all feature quantities in the whole image are classified into corresponding feature quantity groups (Step 201). At this time, the respective feature quantities in the whole image illustrated in FIG. 13 are classified into feature quantity groups corresponding to the television 41, a television stand 43, a chair 42, a table 44, a wall 45, and the like.

Here, the television 41, the television stand 43, the chair 42, the table 44, the wall 45, and the like remain stationary. Therefore, degrees of coincidence between the inertial information and the feature quantity groups corresponding to the television 41, the television stand 43, the chair 42, the table 44, the wall 45, and the like are high (Yes in Step 205). Therefore, all the feature quantity groups corresponding to them are classified as feature quantities of the world coordinate system (Step 206).

Next, in the case where the world coordinate system is not set (No in Step 301) in the coordinate system setting process, the word coordinate system will be set (Step 302).

Next, the self location estimation process is performed. Note that, in this example, the television 41 is designated as a placement target of the virtual object 20a including information regarding news, and the chair 42 is designated as a placement target of the virtual object 20e including information regarding email.

In this case, it is determined that a coordinate system to which the television 41 and chair 42 serving as the placement targets belong are the world coordinate system (Step 402 to Step 403). In addition, amounts of change Δpose1 in locations/postures are estimated on the basis of feature quantities of the world coordinate system (Step 404 to 405). At the same time, amounts of change Δpose2 in locations/postures are estimated on the basis of the inertial information (Step 406 to Step 407).

Next, Kalman gains are calculated on the basis of the covariance matrix (Step 408). Next, the Kalman gains are adjusted (Step 407). However, values of the Kalman gains are used without any change because the self location will be estimated in the world coordinate system.

Next, the self location is estimated in the world coordinate system on the basis of Δpose1, Δpose2, and the Kalman gains (Step 410), and then the post-filtering process is performed (Step 411). In the post-filtering process, the delay compensation based on the inertial information is performed because the self location is estimated in the world coordinate system.

Next, a placement process of the virtual objects 20 is performed. In the case where the virtual objects 20a and 20e have not been placed yet, it is determined that placement at this time is initial placement (Yes in Step 601). In this example, the television 41 and the chair 42 are designated as placement targets (Yes in Step 605). Therefore, it is determined that a coordinate system to which the television 41 and the chair 42 belong is the world coordinate system (Step 606). Next, locations at which the virtual objects 20a and 20e are to be placed and postures to be taken by the virtual objects 20a and 20e are calculated by using the world coordinate system (Step 607), and the virtual objects 20a and 20e are displayed at the calculated locations (Step 606).

After the virtual objects 20a and 20e are initially placed, locations at which the virtual objects 20a and 20e are to be placed and postures to be taken by the virtual objects 20a and 20e are calculated by using the world coordinate system that is the same as the last time as long as the television 41 and the chair 42 remain stationary (Step 608).

Next, it is assumed that the stationary chair 42 is moved in a state where the virtual object 20e has already been placed. In this case, first, it is determined at least whether or not the user is in the first mobile object in the situation recognition process. In this case, it is determined that the user is not in the mobile object.

Next, in the feature quantity classification process, all feature quantities in the whole image are classified into corresponding feature quantity groups (Step 201). At this time, the respective feature quantities in the whole image illustrated in FIG. 13 are classified into feature quantity groups corresponding to the television 41, the television stand 43, the chair 42, the table 44, the wall 45, and the like.

Here, the television 41, the television stand 43, the table 44, the wall 45, and the like remain stationary. Therefore, degrees of coincidence between the inertial information and the feature quantity groups corresponding to the television 41, the television stand 43, the table 44, the wall 45, and the like are high (Yes in Step 205). Therefore, the feature quantity groups corresponding to them are classified as feature quantities of the world coordinate system (Step 206).

On the other hand, it is assumed that the chair 42 is moved, and the degree of coincidence between the inertial information and the movement of the feature quantity group corresponding to the chair 42 becomes a threshold or less (Yes in Step 205). At this time, the user is not in the first mobile object (No in Step 207). Therefore, the feature quantity groups corresponding to the chair 42 is classified as feature quantity of the second mobile object coordinate system corresponding to the chair 42 (Step 211).

Next, the coordinate system setting process is performed. In this example, there is the feature quantity classified into the second mobile object coordinate system (Yes in Step 308). In addition, the second mobile object coordinate system corresponding to the chair 42 has not been set yet (No in Step 309). Therefore, the second mobile object coordinate system corresponding to the chair 42 is newly set (Step 310), and thereby the second mobile object coordinate system is separated from the world coordinate system.

Next, the self location estimation process is performed. In this example, the television 41 is designated as a placement target. Therefore, an amount of change Δpose1 in location/posture is estimated on the basis of feature quantity of the world coordinate system to which the television 41 belongs (Step 402 to Step 405). At this time, feature quantity of the second mobile object coordinate system corresponding to the chair 42 is not used. Note that, subsequent processes regarding the virtual object 20a that is to be placed above the television 41 are basically the same as the above-described processes. Therefore, description thereof will be omitted.

On the other hand, in this example, the chair 42 is designated as a placement target. Therefore, an amount of change Δpose1 in location/posture is estimated on the basis of feature quantity of the second mobile object coordinate system to which the chair 42 belongs (Step 402 to Step 405). Note that, at this time, feature quantity of the world coordinate system is not used. At the same time, an amount of change Δpose2 in location/posture is estimated on the basis of the inertial information (Step 406 to Step 407).

Next, Kalman gain is calculated on the basis of the covariance matrix (Step 408), and the Kalman gain is adjusted (Step 407). At this time, a self location will be estimated in the second mobile object coordinate system. Therefore, the Kalman gain is adjusted in such a manner that Δpose2 based on the inertial information is not trusted at all (is ignored).

Next, the self location is estimated in the second mobile object coordinate system on the basis of Δpose1, Δpose2, and the Kalman gain (Step 410), and then the post-filtering process is performed (Step 411). In the post-filtering process, the delay compensation based on the inertial information is not performed because the self location is estimated in the second mobile object coordinate system.

Next, the self location recalculation process is performed. When the second mobile object coordinate system corresponding to the chair 42 is separated from the world coordinate system (Yes in Step 504), a self location is recalculated retroactive to a predetermined time before a timing at which the separation has occurred (retroactive to a timing at which the chair 42 has been moved), in estimation of the self location in the world coordinate system (Step 505). In this case, the feature quantity group corresponding to the chair 42 is excluded retroactive to the predetermined time before the timing at which the separation has occurred, and then estimation of the self location is recalculated.

In addition, when the second mobile object coordinate system corresponding to the chair 42 is separated from the world coordinate system, estimation of a self location is recalculated retroactive to a predetermined time before a timing at which the separation has occurred (retroactive to a timing at which the chair 42 has been moved), in estimation of the self location in the second mobile object coordinate system (Step 506). In this case, estimation of the self location is recalculated by using the feature quantity group corresponding to the chair 42 retroactive to a predetermined time before the timing at which the separation has occurred.

Next, a placement process of the virtual object 20 is performed. At this time, when the second mobile object coordinate system corresponding to the chair 42 is separated (Yes in Step 602), it is determined that the coordinate system to which the chair 42 serving as a placement target of the virtual object 20e belongs is the second mobile object coordinate system (Step 605 and Step 606). Next, a location at which the virtual object 20e is to be placed and a posture to be taken by the virtual object 20e are calculated by using the second mobile object coordinate system corresponding to the chair 42 (Step 607).

Note that, a location at which the virtual object 20e is to be placed and a posture to be taken by the virtual object 20e are calculated by using the second mobile object coordinate system that is the same as the last time as long as the chair 42 keeps moving (Step 608).

Next, it is assumed that the moving chair 42 stops in a state where the virtual object 20e has already been placed. The situation recognition process is performed first, and then all feature quantities in the whole image are classified into corresponding feature quantity groups in the feature quantity classification process.

It is assumed that the moving chair 42 is stopping, and the degree of coincidence between the inertial information and the movement of the feature quantity group corresponding to the chair 42 exceeds a threshold (No in Step 205). In this case, the feature quantity group corresponding to the chair 42 is classified as feature quantity of the world coordinate system (Step 211). Note that, the feature quantity groups corresponding to the television 41, the television stand 43, the table 44, the wall 45, and the like are also classified as feature quantities of the world coordinate system.

Next, the coordinate system setting process is performed. In this example, there is no feature quantity classified into the second mobile object coordinate system (No in Step 308). In addition, the second mobile object coordinate system corresponding to the chair 42 is set (Yes in Step 311). Therefore, the second mobile object coordinate system corresponding to the chair 42 is deleted (Step 312), and thereby the second mobile object coordinate system corresponding to the chair 42 is integrated into the world coordinate system.

Next, the self location estimation process is performed. In this example, the chair 42 is designated as a placement target. Therefore, an amount of change Δpose1 in location/posture is estimated on the basis of feature quantity of the world coordinate system to which the chair 42 belongs (Step 402 to Step 405). At the same time, an amount of change Δpose2 in location/posture is estimated on the basis of the inertial information (Step 406 and Step 407).

Next, Kalman gain is calculated on the basis of the covariance matrix (Step 408), and the Kalman gain is adjusted (Step 407). At this time, a value of the Kalman gain is used without any change because the self location will be estimated in the world coordinate system.

Next, the self location is estimated in the world coordinate system on the basis of Δpose1, Δpose2, and the Kalman gain (Step 410), and then the post-filtering process is performed (Step 411). In the post-filtering process, the delay compensation based on the inertial information is performed because the self location is estimated in the world coordinate system.

Next, a placement process of the virtual object 20 is performed. At this time, when the second mobile object corresponding to the chair 42 is integrated into the world corresponding to (Yes in Step 603), it is determined that the coordinate system to which the chair 42 serving as a placement target of the virtual object 20e belongs is the world coordinate system (Step 605 to Step 606). Next, a location at which the virtual object 20 is to be placed and a posture to be taken by the virtual object 20 are calculated by using the world coordinate system (Step 607).

Note that, a location at which the virtual object 20 is to be placed and a posture to be taken by the virtual object 20 are calculated by using the world coordinate system that is the same as the last time as long as the chair 42 remains stationary (Step 608).

Application Example 2

(Case where User is in Car 30)

Next, an example in which virtual objects 20 are placed in a state where a user is in the car 30 will be described. Note that, the example in which the virtual objects 20 are placed in a state where the user is in the car 30 has already been described above with reference to FIG. 10 and FIG. 11. Therefore, the example will be simply described in chronological order.

For example, it is assumed that, when the user is in the living room (see FIG. 12 and FIG. 13), the user reaches his/her hand toward the virtual object 20a of news that is placed above the television 41 and makes a specific gesture while the hand is captured by the imaging units 4. In this case, the virtual object 20a of news gets smaller and floats around the HMD 100 (the user). Next, when the user moves, the virtual object 20a also moves in conformity with the movement of the user (the user can see the virtual object 20a in a certain distance from the user even when the user moves).

Note that, to achieve such behavior of the virtual object 20a, the control unit 1 performs the following processes, for example. First, the control unit 1 determines whether the user has provided a specific input (such as a gesture input via the imaging units 4, a sound input via the microphone 7, or an operation input via the operation unit 6). In the case where the user has provided the specific input, the control unit 1 changes the placement location of the virtual object 20a in the world coordinate system in such a manner that the placement location of the virtual object 20a is within the certain distance from the user when the user moves in the world coordinate system (the virtual character 20a is set to follow the user). Next, in accordance with the change in the placement location, the control unit 1 causes the display unit 3 to display the virtual object 20a as if the virtual object 20a were floating at that location.

Note that, when the specific input from the user is detected, it is also possible for the control unit 1 to switch the coordinate system to which the virtual object 20 belongs from the world coordinate system to a self coordinate system (a coordinate system in which the HMD 100 serves as an origin). Next, the control unit 1 may display the virtual object 20 as if the virtual object 20 were floating in the certain distance from the user.

Next, it is assumed that the user sits in a driver's seat in the car 30, reaches his/her hand toward the dashboard 31 and performs a specific gesture operation. In this case, the dashboard 31 is designated as a placement target of the virtual object 20a of news.

At this time, it is first determined that the user is in the first mobile object in the situation recognition process. The car 30 is at a stop now. Therefore, all feature quantity groups are classified as feature quantities of the world coordinate system in the feature quantity classification process as long as there is no moving object such as the oncoming car 25 (Step 206).

In the self location estimation process, it is determined that the coordinate system to which the dashboard 31 serving as the placement target belongs is the world coordinate system (Step 402 to Step 403), and a self location is estimated in the world coordinate system (Step 404 to Step 411).

When the virtual object 20a of news floating around the user is initially placed above the dashboard 31 in the virtual object placement process (Yes in Step 601), it is determined that the coordinate system to which the dashboard 31 belongs is the world coordinate system (Step 605 to Step 606). Next, a location at which the virtual object 20a of news is to be placed and a posture to be taken by the virtual object 20a of news are calculated by using the world coordinate system (Step 607).

Note that, for example, it is also possible to place a plurality of different types of virtual objects 20 in the car 30.

When the user starts driving, the stopped car 30 starts running, and the degrees of coincidence between the inertial information and movements of the respective feature quantity groups corresponding to the structural elements of the car 30 become a threshold or less (Yes in Step 205), the feature quantity groups corresponding to the respective structural elements of the car 30 are classified into the first mobile object coordinate system (Step 210). Next, the first mobile object coordinate system is separated from the world coordinate system (Step 305).

In the self location estimation process, it is determined that the coordinate system to which the dashboard 31 serving as the placement target belongs is the first mobile object coordinate system (Step 402 and Step 403), and a self location is estimated in the first mobile object coordinate system (Step 404 to Step 411).

In the self location recalculation process, when the first mobile object coordinate system corresponding to the car 30 is separated from the world coordinate system (Yes in Step 501), a self location is recalculated in the world coordinate system retroactive to a predetermined time before a timing at which the separation has occurred (retroactive to a timing at which the car 30 has started running) (Step 502). In this case, the feature quantity groups corresponding to the car 30 are excluded retroactive to a predetermined time before the timing at which the separation has occurred, and then the self location is recalculated.

In addition, when the first mobile object coordinate system is separated from the world coordinate system, estimation of the self location is recalculated retroactive to a predetermined time before a timing at which the separation has occurred (retroactive to a timing at which the car 30 has started running), in estimation of the self location in the first mobile object coordinate system (Step 503). In this case, the self location is recalculated by using the feature quantity groups corresponding to the respective structural elements of the car 30 retroactive to a predetermined time before the timing at which the separation has occurred.

Next, a placement process of the virtual object 20 is performed. When the first mobile object coordinate system is separated from the world coordinate system at this time (Yes in Step 602), a location at which the virtual object 20*a* of news is to be placed and a posture to be taken by the virtual object 20*a* of news are calculated by using the first mobile object coordinate system to which the dashboard 31 belongs (Step 605 to Step 607).

While the car 30 is running, the self location is estimated in the world coordinate system (Step 401 to Step 411).

In the virtual object placement process, it is assumed that timing of displaying the arrow virtual object 20*b* for route guidance has come (Yes in Step 601). In this case, a location at which the virtual object 20*b* is to be placed and a posture to be taken by the virtual object 20*b* are calculated by using the world coordinate system to which the road 21 belongs (Step 607).

In addition, in the virtual object placement process, it is assumed that a distance between the HMD 100 (the user) and the building 22 becomes a threshold or less (Yes in Step 601). In this case, a location at which the virtual object 20*c* including information regarding the building is to be placed and a posture to be taken by the virtual object 20*c* are calculated by using the world coordinate system to which the building 22 belongs (Step 607).

In addition, when there is the (running) oncoming car 25 while the car 30 is running, the self location is estimated in the second mobile object coordinate system corresponding to the oncoming car 25 (Step 401 to Step 411).

In the virtual object placement process, it is assumed that a distance between the HMD 100 (the user) and the oncoming car 25 becomes a threshold or less (Yes in Step 601). In this case, a location at which the virtual object 20*d* including information regarding the oncoming car is to be placed and a posture to be taken by the virtual object 20*d* are calculated by using the second mobile object coordinate system to which the oncoming car 25 belongs (Step 607).

When the running car 30 is stopping and the degrees of coincidence between the inertial information and movements of the respective feature quantity groups corresponding to the structural elements of the car 30 exceeds a threshold (No in Step 205), the feature quantity groups corresponding to the respective structural elements of the car 30 are classified into the world coordinate system (Step 206). Next, the first mobile object coordinate system is integrated into the world coordinate system (Step 307).

In the self location estimation process, a self location is estimated in the world coordinate system to which the dashboard 31 belongs (Step 401 to Step 411).

In the virtual object placement process, when the first mobile object coordinate system is integrated into the world coordinate system (Yes in Step 603), a location at which the virtual object 20*a* of news is to be placed and a posture to be taken by the virtual object 20*a* of news are calculated by using the world coordinate system to which the dashboard 31 belongs (Step 607).

It is assumed that the user gets out of the car 30 while the virtual object 20*a* placed in the car 30 remains in the car 30 (it is also possible for the user to bring out the virtual object 20*a*). Next, when the user comes back to the car 30, it is possible to reproduce the virtual object 20*a* in the same state as before. Such a reproduction can be achieved in the case where the control unit 1 stores the state of the virtual object 20*a* (such as feature quantity of the placement target and a positional relationship to the virtual object 20*a*) when the user gets out of the car 30, for example.

In addition, for example, it is also possible to place a pin-shaped virtual object 20 serving as a landmark at a specific point on the earth when the user reaches his/her hand toward a direction of the specific point on the earth and makes a specific gesture while the user is in the car (or while the user is walking). The pin-shaped virtual object 20 is displayed as if the virtual object 20 were standing at the same place when the user visits the place again.

Note that, to achieve the above-described behavior, the control unit 1 places the virtual object 20 at a specific point in the world coordinate system when the user provides a specific input (such as a gesture input via the imaging units 4, a sound input via the microphone 7, or an operation input via the operation unit 6), for example. In addition, it is only necessary for the control unit 1 to store the location of the world coordinate system in the storage unit 2.

Application Example 3

(Amusement Ride of Cart 50)

Next, a case where the present technology is applied to an amusement ride of a cart 50 in an amusement park will be described.

Figure 14:
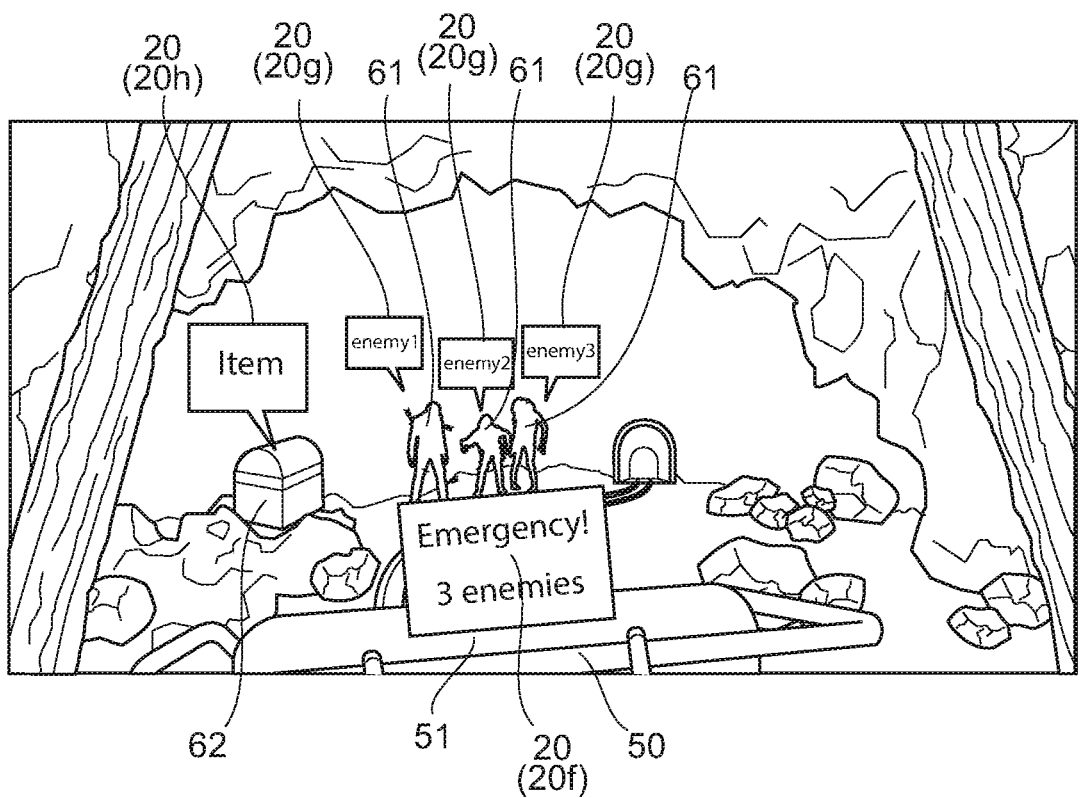
FIG. 14 is a diagram illustrating an example of a field of view seen by a user while the user is in a cart.
Figure 15:
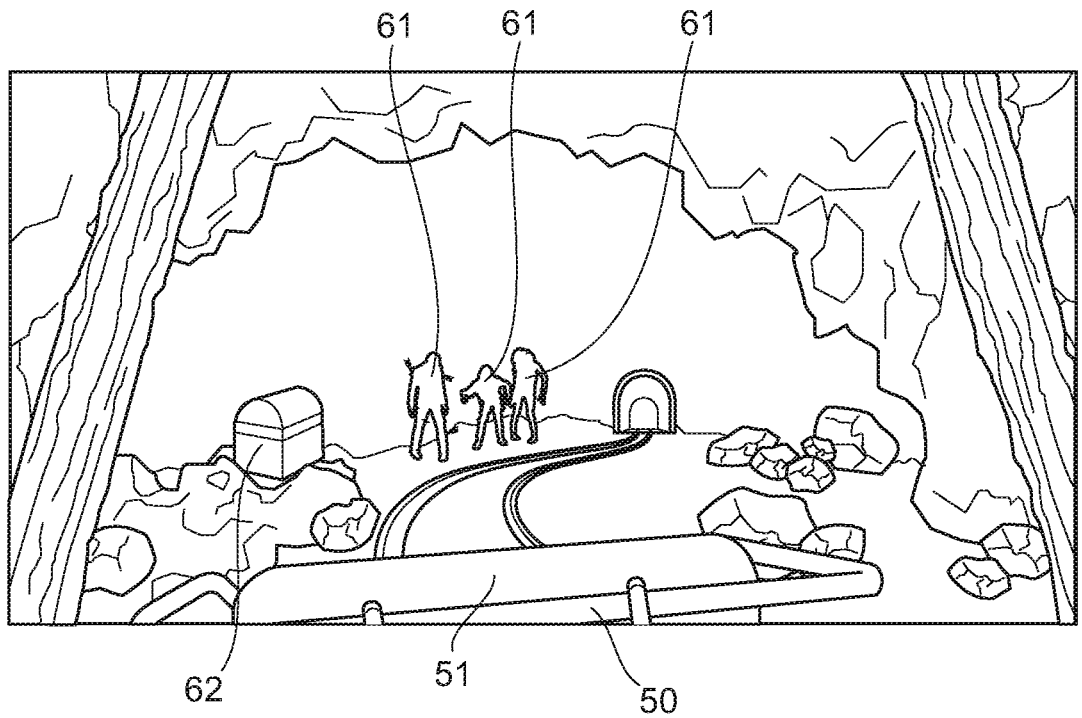
FIG. 15 is a diagram illustrating an example of image information captured by the imaging units while the user is in the cart.

FIG. 14 is a diagram illustrating an example of a field of view seen by a user while the user is in the cart 50. FIG. 15 is a diagram illustrating an example of image information captured by the imaging units 4 while the user is in the cart 50.

In this example, an amusement ride is assumed. In the amusement ride, the user defeats enemies by using a (fake) gun and gets an item in a treasure box 62 while riding the cart 50. The enemies 61 are human or dolls. In this embodiment, the enemies 61 are assumed to move. However, the enemies 61 may remain stationary. In addition, the treasure box 62 is assumed to remain stationary. However, it is also possible to move the treasure box 62.

In FIG. 14, a virtual object 20*f* including information regarding progression of the amusement ride is placed above a front end portion 51 of the cart 50. In addition, virtual objects 20*g* including information regarding the enemies 61 are placed above the enemies 61, and a virtual object 20*h* including information regarding the item is placed above the treasure box 62.

The virtual object 20*g* placed above the enemy 61 may be guidance about aim of the gun, or may be guidance about a status (such as offensive capability, resistance characteristic, and remaining power) of the enemy 61. Alternatively, the virtual object 20*g* placed above the enemy 61 may be a visual effect indicating that a bullet has hit the enemy 61, or the like. In addition, the virtual object 20*h* placed above the treasure box 62 may be guidance indicating contents of items in the treasure box 62 or may be a visual effect indicating that a bullet has hit the treasure box 62, or the like.

Note that, the car 30 in the above-described example corresponds to the cart 50 (the first mobile object), the oncoming car 25 corresponds to the enemy 61 (the second mobile object), and the building 22 corresponds to the treasure box 62. Therefore, basic processes are the same as the example of the car 30, and the basic processes will be simply described in chronological order.

In this description, it is assumed that the front end portion 51 of the cart 50 is designated as a placement target of the virtual object 20*f* including information regarding progression of the amusement ride. In addition, the enemies 61 are designated as placement targets of the virtual objects 20*g* including information regarding the enemies 61, and the treasure box 62 is designated as a placement target of the virtual object 20*h* including information regarding the item.

It is assumed that the user gets in the stopped cart 50. At this time, it is first determined that the user is in the first mobile object in the situation recognition process. The cart 50 is at a stop now. Therefore, all feature quantity groups are classified as feature quantities of the world coordinate system in the feature quantity classification process as long as there is no moving object such as the enemies 61 (Step 206).

In the self location estimation process, it is determined that the coordinate system to which the front end portion 51 of the cart 50 serving as the placement target belongs is the world coordinate system (Step 402 and Step 403), and a self location is estimated in the world coordinate system (Step 404 to Step 411). Note that, when estimating the self location in the world coordinate system, it is possible to estimate the self location in view of a location of the cart 50 that is acquirable from a system of the amusement park.

When the virtual object 20*f* regarding progression of the amusement ride is initially placed in the process of placing the virtual object 20 (Yes in Step 401), it is determined that the coordinate system to which the front end portion 51 of the cart 50 belongs is the world coordinate system (Step 605 to Step 606). Next, a location at which the virtual object 20*f* including information regarding progression of the amusement ride is to be placed and a posture to be taken by the virtual object 20*f* are calculated by using the world coordinate system (Step 607).

When the cart 50 starts running and the degree of coincidence between the inertial information and movements of the respective feature quantity groups corresponding to the structural elements of the cart 50 become a threshold or less (Yes in Step 205), the feature quantity groups corresponding to the respective structural elements of the cart 50 are classified into the first mobile object coordinate system (Step 210). Next, the first mobile object coordinate system is separated from the world coordinate system (Step 305).

In the self location estimation process, a self location is estimated in the first mobile object coordinate system to which the front end portion 51 of the cart 50 belongs (Step 401 to Step 411).

When the first mobile object coordinate system corresponding to the cart 50 is separated from the world coordinate system (Yes in Step 501), a self location is recalculated retroactive to a predetermined time before a timing at which the separation has occurred (retroactive to a timing at which the cart 50 has started running), in estimation of the self location in the world coordinate system (Step 502). In this case, the feature quantity group corresponding to the cart 50 is excluded retroactive to the predetermined time before the timing at which the separation has occurred, and then the self location is recalculated.

In addition, when the first mobile object coordinate system is separated from the world coordinate system, estimation of the self location is recalculated retroactive to a predetermined time before a timing at which the separation has occurred (retroactive to a timing at which the cart 50 has started running), in estimation of the self location in the first mobile object coordinate system (Step 503). In this case, the self location is recalculated by using the feature quantity groups corresponding to the respective structural elements of the cart 50 retroactive to the predetermined time before the timing at which the separation has occurred.

Next, a virtual object placement process is performed. When the first mobile object coordinate system is separated from the world coordinate system at this time (Yes in Step 602), a location at which the virtual object 20*f* regarding progression of the amusement ride is to be placed and a posture to be taken by the virtual object 20*f* are calculated by using the first mobile object coordinate system to which the front end portion 51 of the cart 50 belongs (Step 605 to Step 607).

While the cart 50 is running, the self location is estimated in the world coordinate system (Step 401 to Step 411).

With regard to the virtual objects 20, it is assumed that a distance between the HMD 100 (the user) and the treasure box 62 becomes a threshold or less (Yes in Step 601). In this case, a location at which the virtual object 20*h* including information regarding the item is to be placed and a posture to be taken by the virtual object 20*h* are calculated by using the world coordinate system to which the treasure box 62 belongs (Step 607).

In addition, when there are the (moving) enemies 61 while the cart 50 is running, the self location is estimated in the second mobile object coordinate system corresponding to the enemies 61 (Step 401 to Step 411).

Note that, in the example illustrated in FIG. 14 and FIG. 15, three second mobile object coordinate systems corresponding to the three enemies 61 are respectively prepared, and a self location is estimated in the three second mobile object coordinate systems. Note that, when estimating the self location in the second mobile object coordinate systems, it is possible to estimate the self location in view of locations of the enemies 61 that are acquirable from the system of the amusement park.

In the virtual object placement process, it is assumed that a distance between the HMD 100 (the user) and the enemy 61 becomes a threshold or less (Yes in Step 601). In this case, a location at which the virtual object 20*g* including information regarding the enemy 61 is to be placed and a posture to be taken by the virtual object 20*g* are calculated by using the second mobile object coordinate system to which the enemy 61 belongs (Step 607).

When the running cart 50 is stopping and the degrees of coincidence between the inertial information and movements of the respective feature quantity groups corresponding to the structural elements of the cart 50 exceed a threshold (No in Step 205), the feature quantity groups corresponding to the respective structural elements of the cart 50 are classified into the world coordinate system (Step 206). Next, the first mobile object coordinate system is integrated into the world coordinate system (Step 307).

In the self location estimation process, a self location is estimated in the world coordinate system to which the cart 50 belongs (Step 401 to Step 411).

Next, a placement process of the virtual object 20 is performed. When the first mobile object coordinate system is integrated into the world coordinate system at this time (Yes in Step 603), a location at which the virtual object 20f regarding progression of the amusement ride is to be placed and a posture to be taken by the virtual object 20f are calculated by using the world coordinate system to which the cart 50 belongs (Step 605 to Step 607).

<Workings, etc.>

As described above, the HMD 100 according to the present embodiment estimates a self location of the HMD 100 on the basis of image information and inertial information. In addition, a situation of the user who is wearing the HMD 100 (is the user with the HMD 100) (such as whether the user is in the first mobile object) is recognized, and a ratio (Kalman gain) of reliability between the image information and the inertial information that are to be used for estimating the self location is changed depending on the situation.

Accordingly, it is possible to accurately estimate the self location even in the case where the user who is wearing the HMD 100 is in a specific situation such as a situation where the user is in the car 30 or the like. As a result, it is possible to accurately place (localize) the virtual objects 20 on the placement targets. For example, it is possible to prevent a situation where the virtual object 20a of news illustrated in FIG. 10 and the virtual object 20f regarding progression of the amusement ride illustrated in FIG. 14 move toward the rear sides of the car 30 and the cart 50 and the user cannot see the virtual objects 20.

In addition, in the present embodiment, feature quantities are extracted from the image information, and it is determined that which of the feature quantities is to be used (the feature quantities are classified) for estimating a self location in accordance with the situation. In particular, according to the present embodiment, it is determined which of the feature quantities in the image information is to be used (the feature quantities are classified) for estimating a self location in each coordinate system.

This makes it possible to prevent feature quantities of objects in the world coordinate system and the second mobile object coordinate system that are not related to the first mobile object coordinate system from being reflected in the estimation of a self location when estimating the self location in the first mobile object coordinate system on the basis of the image information, for example.

In a similar way, it is possible to prevent feature quantities in the first mobile object coordinate system and the second mobile object coordinate system that are not related to the world coordinate system from being reflected in the estimation of a self location when estimating the self location in the world coordinate system on the basis of the image information.

In a similar way, it is possible to prevent feature quantities of objects in the world coordinate system and the first mobile object coordinate system that are not related to the second mobile object coordinate system from being reflected in the estimation of a self location when estimating the self location in the second mobile object coordinate system on the basis of the image information.

Therefore, according to the present embodiment, it is possible to further improve accuracy of estimation of a self location.

In addition, according to the present embodiment, degrees of coincidence of the inertial information and movements of feature quantities are determined, and it is determined which of the feature quantities in the image information is to be used (the feature quantities are classified) for estimating a self location in each coordinate system on the basis of the degrees of coincidence.

This makes it possible to appropriately determine which of the feature quantities in the image information is to be used for estimating a self location (it possible to appropriately classify the feature quantities of the image information) in each coordinate system.

In addition, according to the present embodiment, it is possible to set one or more coordinate system depending on the situation, and it is possible to estimate respective self locations in the coordinate systems (at the same time).

For example, as illustrated in FIG. 14, this makes it possible to display virtual object 20 of the first mobile object coordinate system (the car 30 and the cart 50), the virtual object 20 of the world coordinate system (the building 22 and the treasure box 62), and the virtual object 20 of the second mobile object coordinate system (the oncoming car 25 and the enemies 61) at the same time.

In addition, according to the present embodiment, the ratio (Kalman gain) is changed in such a manner that, among the image information and the inertial information, the image information is to be used more reliably for estimating a self location in the first mobile object coordinate system. In particular, according to the present embodiment, the ratio is changed in such a manner that, among the image information and the inertial information, only the image information is to be used reliably for estimating a self location in the first mobile object coordinate system.

This makes it possible to further improve accuracy of estimation of a self location in the first mobile object coordinate system.

In addition, according to the present embodiment, the ratio (Kalman gain) is changed in such a manner that, among the image information and the inertial information, the image information is to be used more reliably for estimating a self location in the second mobile object coordinate system. In particular, according to the present embodiment, the ratio is changed in such a manner that, among the image information and the inertial information, only the image information is to be used reliably for estimating a self location in the second mobile object coordinate system.

This makes it possible to further improve accuracy of estimation of a self location in the second mobile object coordinate system.

In addition, according to the present embodiment, the ratio (Kalman gain) is changed in such a manner that the one or more coordinate systems have different ratios.

In other words, although a value of the Kalman gain is used without any change in the world coordinate system, the Kalman gain is changed in the first mobile object coordinate system and the second mobile object coordinate system in such a manner that, among the image information and the inertial information, the image information is to be used more reliably in the first mobile object coordinate system and the second mobile object coordinate system.

This makes it possible to appropriately adjust the Kalman gain for each coordinate system.

In addition, according to the present embodiment, when the first mobile object coordinate system is separated from the world coordinate system, a self location is recalculated retroactive to a predetermined time before a timing at which the separation has occurred, in estimation of the self location in the world coordinate system.

This makes it possible to further improve accuracy of estimation of a self location in the world coordinate system.

In addition, according to the present embodiment, when the first mobile object coordinate system is separated from the world coordinate system, a self location is recalculated retroactive to a predetermined time before a timing at which the separation has occurred, in estimation of the self location in the first mobile object coordinate system.

This makes it possible to further improve accuracy of estimation of a self location in the first mobile object coordinate system.

In addition, according to the present embodiment, when the second mobile object coordinate system is separated from the world coordinate system, a self location is recalculated retroactive to a predetermined time before a timing at which the separation has occurred, in estimation of the self location in the world coordinate system.

This makes it possible to further improve accuracy of estimation of a self location in the world coordinate system.

In addition, according to the present embodiment, when the second mobile object coordinate system is separated from the world coordinate system, a self location is recalculated retroactive to a predetermined time before a timing at which the separation has occurred, in estimation of the self location in the second mobile object coordinate system.

This makes it possible to further improve accuracy of estimation of a self location in the second mobile object coordinate system.

Second Embodiment

<Entire Configuration and Configurations of Respective Structural Elements>

Figure 16:
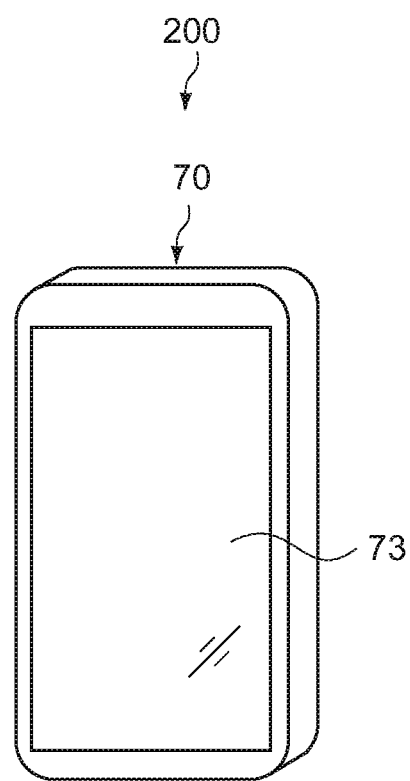
FIG. 16 is a perspective view of a smartphone according to a second embodiment of the present technology.
Figure 17:
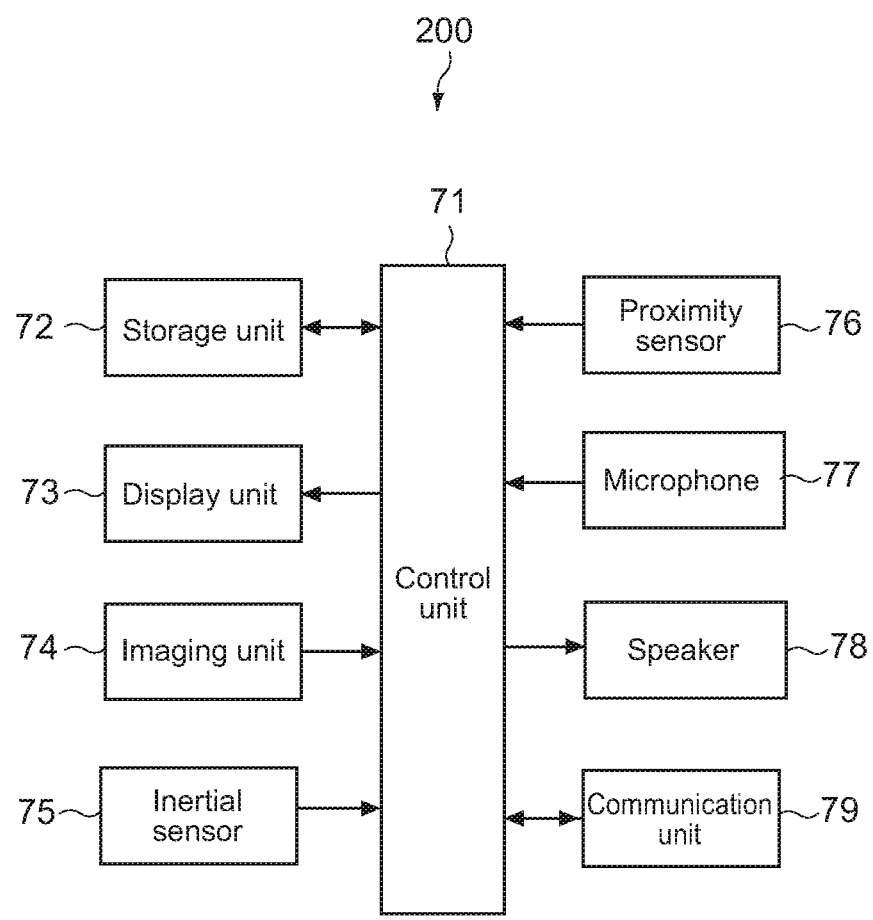
FIG. 17 is a block diagram illustrating an internal configuration of the smartphone.

FIG. 16 is a perspective view of a smartphone 200 (an information processing apparatus) according to a second embodiment of the present technology. FIG. 17 is a block diagram illustrating an internal configuration of the smartphone 200.

As illustrated in FIG. 16 and FIG. 17, the smartphone 200 includes a casing 70, a control unit 71, a storage unit 72, a display unit 73, imaging units 74, an inertial sensor 75, a proximity sensor 76, a microphone 77, a speaker 78, and a communication unit 79.

The casing 70 has a plate-like shape, and the casing 70 is sized so that it can be held by the user. The display unit 73 is provided on a front side of the casing 70. The display unit 73 is capable of displaying an image corresponding to a real space, the image being captured by the imaging units 74. In addition, the display unit 73 is capable of displaying a virtual object 20 in such a manner that the virtual object 20 overlaps the image.

The imaging units 74 are provided on a rear surface side of the casing 70. In the present embodiment, the number of imaging units 74 is two. However, it is also possible for the smartphone 200 to include only one imaging unit 74. The imaging units 4 capture an image of objects that are present in front of the rear surface side of the casing 70, and output image information obtained through the image capturing to the control unit 1.

The inertial sensor 75 includes a triaxial acceleration sensor that detects acceleration in triaxial directions, and an angular velocity sensor that detects angular velocities about three axes. The inertial sensor 75 outputs the acceleration in the triaxial directions and the angular velocities about the three axes that have been obtained through detection as inertial information to the control unit 71.

The proximity sensor 76 is provided on the front surface of the display unit 73. The proximity sensor 76 detects proximity of a finger of the user to the display unit 73, and outputs, to the control unit 71, a signal indicating the proximity of the finger of the user and a signal indicating a finger proximity location.

The microphone 77 converts voice of the user on the phone and environmental sound around the user into electric signals and outputs the signals to the control unit 71. For example, the speaker 78 outputs, as sound, voice on the other end of the line, auxiliary information related to the virtual object 20 displayed on the display unit 73, or the like.

The communication unit 79 communicates with another phone or an external device directly or indirectly, for example.

The control unit 71 performs various computations on the basis of various kinds of programs stored in the storage unit 72, and integrally controls the respective structural elements of the smartphone 200. The storage unit 72 includes non-volatile memory that stores various kinds of data and programs necessary for the processes performed by the control unit 71, and volatile memory used as a workspace of the control unit 71.

<Description of Operation>

Next, processes performed by the control unit 71 will be described. Note that, basic processes according to the second embodiment are the same as the processes according to first embodiment illustrated in FIG. 4 to FIG. 9. Therefore, the processes performed by the control unit 71 will be described with reference to FIG. 4 to FIG. 9.

Note that, in this description, to create a hometown promotion video, it is assumed that a user and a virtual character 20*i* (a virtual object) go to a destination by train 90. For example, the virtual character 20*i* is a character (also referred to as a mascot character) used for publicizing the hometown. The promotion video is uploaded to a server apparatus on a network via the communication unit 9, and is distributed in real time or in non-real time.

[Placement of Virtual Character on Platform]

First, a process performed when the user places the virtual character 20*i* on a platform 81 in the image will be described.

Figure 18:
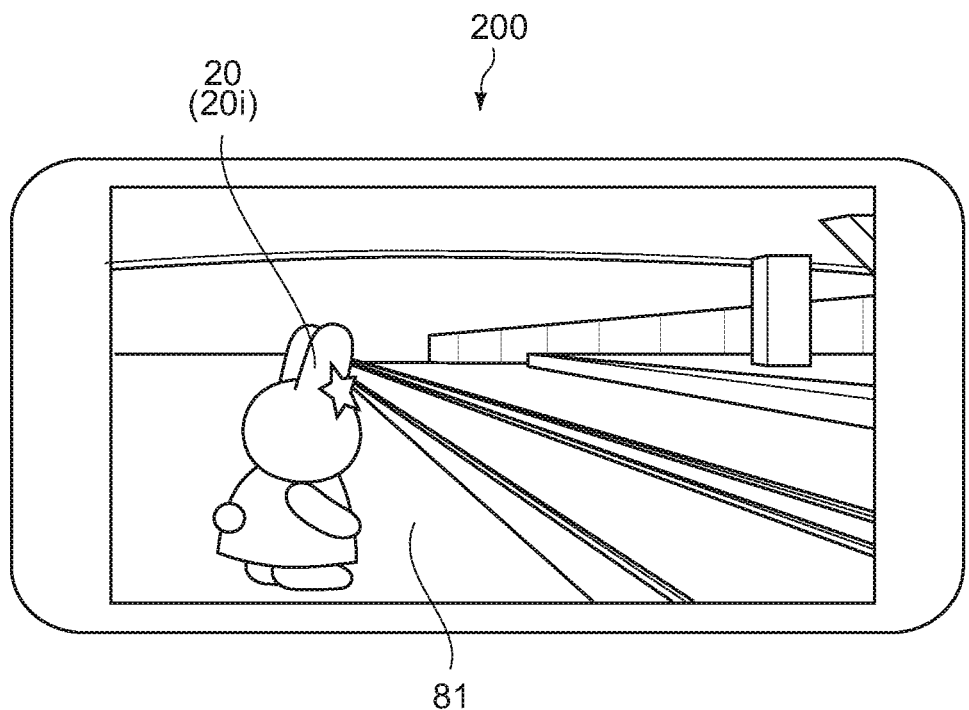
FIG. 18 is a diagram illustrating a scenario where a virtual character is placed on an image captured by the imaging units while a user is waiting for a train on a platform.

FIG. 18 is a diagram illustrating a scenario where the virtual character 20*i* is placed on an image captured by the imaging units 4 while the user is waiting for the train 90 on the platform 81.

For example, it is assumed that the user who is carrying the smartphone 200 (the user with the smartphone 200) is standing on the platform 81 and holds the smartphone 200 in such a manner that the imaging units 4 of the smartphone 200 face a direction of the platform 81. At this time, when the user performs an operation by touching any position of the platform 81 on a screen, the any position of the platform 81 is designated as a placement target of the virtual character 20*i*.

In this case, a situation of the user is first recognized on the basis of inertial information and image information in the state recognition process (Step 101 to Step 104). In this case, it is determined at least whether or not the user is in the first mobile object. In this case, it is determined that the user is not in the mobile object.

Next, in the feature quantity classification process, all feature quantities in the whole image are classified into corresponding feature quantity groups (Step 201). At this time, all feature quantity groups are classified as feature quantities of the world coordinate system as long as there is no moving object in the image (Step 206).

Next, in the case where the world coordinate system is not set, the word coordinate system will be set in the coordinate system setting process (Step 302).

Next, the self location estimation process is performed. Here, the any position of the platform 81 (the position touched by the user) is designated as the placement target of the virtual character 20*i* (Step 402). Therefore, it is determined that a coordinate system to which the platform 81 belongs is the world coordinate system (Step 403). Next, a self location is estimated in the world coordinate system to which the platform 81 belongs (Step 404 to Step 411).

Next, a placement process of the virtual character 20*i* is performed. When the user performs an operation by touching any position of the platform 81 on the screen in the case where the virtual character 20*i* has not been placed yet, it is determined that placement at this time is initial placement (Yes in Step 601).

The any position of the platform 81 (the position touched by the user) is designated as the placement target of the virtual character 20*i* (Step 605). Therefore, it is determined that a coordinate system to which the platform 81 belongs is the world coordinate system (Step 606). Next, a location at which the virtual character 20*i* is to be placed and a posture to be taken by the virtual character 20*i* are calculated by using the world coordinate system (Step 607), and the virtual character 20*i* is displayed (Step 609).

After the virtual character 20*i* is initially placed, a location at which the virtual character 20*i* is to be placed and a posture to be taken by the virtual character 20*i* are calculated by using the world coordinate system that is the same as the last time (Step 608).

[Placement of Virtual Object on Train]

Figure 19:
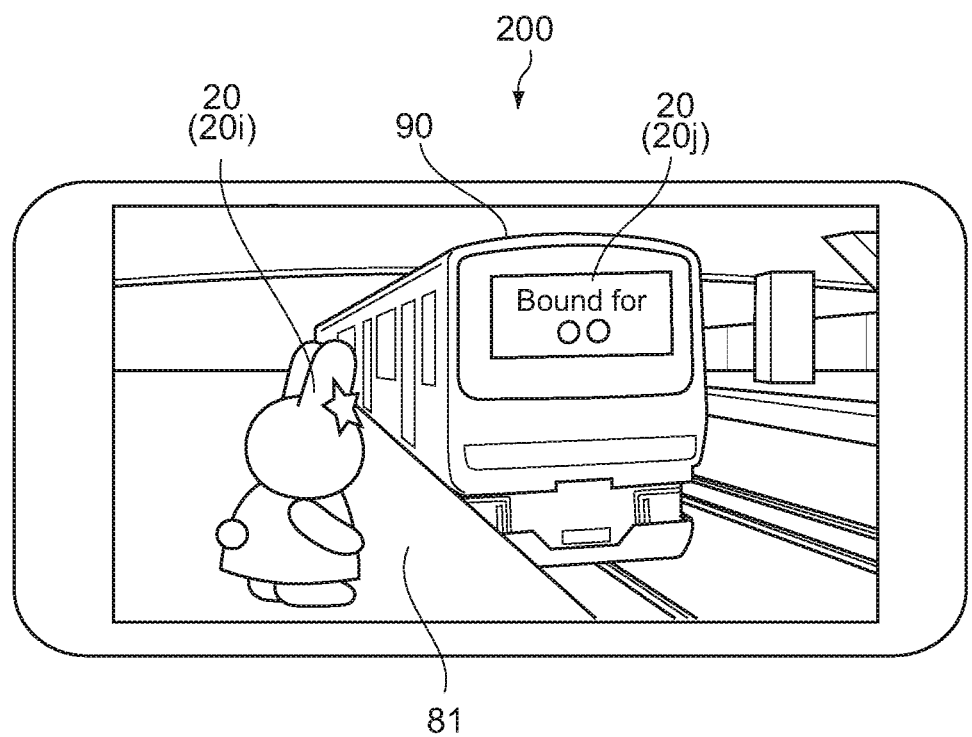
FIG. 19 is a diagram illustrating a scenario where a virtual object is placed on a train while a user is waiting for the train on a platform.

Next, a process of placing a virtual object 20*j* on the train 90 will be described. FIG. 19 is a diagram illustrating a scenario where the virtual object 20*j* is placed on the train 90 while a user is waiting for the train 90 on the platform 81.

When the running train 90 is included in the image captured by the imaging units 4, a feature quantity group corresponding to the train 90 is classified as feature quantity in the second mobile object coordinate system corresponding to the train 90 (Step 211). Therefore, the second mobile object coordinate system corresponding to the train 90 is newly set, and the second mobile object coordinate system is separated from the world coordinate system (Step 310).

Next, the self location estimation process is performed. Note that, in this description, it is assumed that the train 90 is designated as a placement target of the virtual object 20*j*.

In this case, a self location is estimated in the second mobile object coordinate system to which the train 90 serving as the placement target belongs (Step 401 to Step 411). When estimating the self location in the second mobile object coordinate system corresponding to the train 90, it is possible to consider positional information (GPS information) obtained from the train 90, positional information (GPS information) of the smartphone 200, and the like.

Note that, to place the virtual character 20*i*, a self location is also estimated in the world coordinate system. However, when estimating the self location in the world coordinate system, feature quantities of the second mobile object coordinate system are excluded.

In the virtual object placement process, it is assumed that a distance between the smartphone 200 (the user) and the train 90 becomes a threshold or less (Yes in Step 601). In this case, a location at which the virtual object 20*j* including information regarding the train is to be placed and a posture to be taken by the virtual object 20*j* are calculated by using the second mobile object coordinate system to which the train 90 belongs (Step 607). Next, the virtual object 20 is displayed on the train 90 (Step 609).

It is assumed that the running train 90 is stopping, and the degree of coincidence between the inertial information and the movement of the feature quantity group corresponding to the train 90 exceeds a threshold (No in Step 205). In this case, the feature quantity group corresponding to the train 90 is classified as a feature quantity of the world coordinate system (Step 211).

At this time, the second mobile object coordinate system corresponding to the train 90 is deleted (Step 312), and thereby the second mobile object coordinate system corresponding to the train 90 is integrated into the world coordinate system.

Subsequently, all feature quantities are classified as feature quantities of the world coordinate system as long as the train 90 is at a stop and the image includes no other moving object. Next, a self location is estimated on the basis of the inertial information and the feature quantities of the world coordinate system to place the virtual character 20*i* and the virtual object 20*j*.

[Inside of Train]

Figure 20:
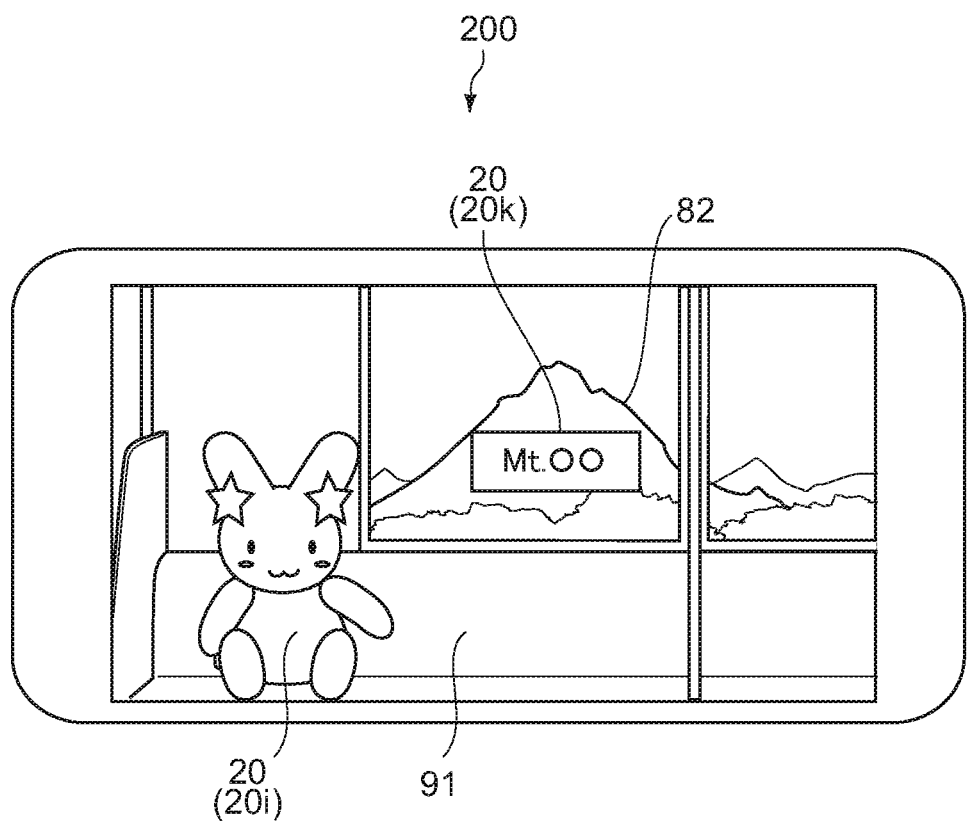
FIG. 20 is a diagram illustrating an example of a screen displayed while a user is in a train.

Next, a process performed when the user is in the train 90 will be described. FIG. 20 is a diagram illustrating an example of a screen displayed while the user is in the train 90.

When the user walks on the platform 81 and gets in the train 90, the virtual character 20*i* also walks on the platform 81 and gets in the train 90 in the image.

Note that, to achieve such behavior of the virtual character 20*i*, the control unit 71 performs the following processes, for example. First, the control unit 71 determines whether the user has provided a specific input (such as a gesture input via the imaging units 4, a sound input via the microphone 7, or an operation input via the operation unit (the proximity sensor 76)). In the case where the specific input is detected, the control unit 71 changes the placement location of the virtual character 20*i* in the world coordinate system in such a manner that the placement location of the virtual character 20*i* is within the certain distance from the user when the user moves in the world coordinate system (the virtual character 20*i* is set to follow the user). Next, in accordance with the change in the placement location, the control unit 71 displays the virtual character 20*i* on the screen as if the virtual character 20*i* walked to the location.

Note that, when the specific input from the user is detected, it is also possible for the control unit 71 to switch the coordinate system to which the virtual character 20*i* belongs from the world coordinate system to a self coordinate system (a coordinate system in which the smartphone 200 serves as an origin). Next, the control unit 71 may display the virtual character 20*i* as if the virtual character 20*i* were within the certain distance from the user.

Next, it is assumed that the user holds the smartphone 200 in such a manner that the imaging units 4 face the direction of a seat 91 in the train 90, and the user performs an operation by touching a specific position of the seat 91 in an image. In this case, the seat 91 is designated as a placement target of the virtual character 20*i*. At this time, the control unit 1 displays the virtual object 20 on the screen as if the virtual object 20 walked and sat on the seat 91.

When the user gets in the train 90, it is determined that the user is in the first mobile object in the situation recognition process. The train 90 is at a stop now. Therefore, all feature quantity groups are classified as feature quantities of the world coordinate system in the feature quantity classification process as long as there is no moving object in the image (Step 206).

In the self location estimation process, it is determined that the coordinate system to which the seat 91 serving as the placement target belongs is the world coordinate system (Step 402 to Step 403), and a self location is estimated in the world coordinate system (Step 404 to Step 411).

When the virtual character 20i is initially placed on the seat 91 in the process of placing the virtual object 20 (Yes in Step 401), it is determined that the coordinate system to which the seat 91 belongs is the world coordinate system (Step 605 to Step 606). Next, a location at which the virtual character 20i is to be placed and a posture to be taken by the virtual character 20i are calculated by using the world coordinate system (Step 607).

When the train 90 starts running and the degrees of coincidence between the inertial information and movements of the respective feature quantity groups corresponding to the structural elements (such as the seat 91 and an inner wall illustrated in FIG. 20) of the train 90 become a threshold or less (Yes in Step 205), the feature quantity groups corresponding to the respective structural elements of the train 90 are classified into the first mobile object coordinate system (Step 210). Next, the first mobile object coordinate system is separated from the world coordinate system (Step 305).

In the self location estimation process, a self location is estimated in the first mobile object coordinate system to which the seat 91 serving as the placement target belongs (Step 401 to Step 411).

When the first mobile object coordinate system corresponding to the train 90 is separated from the world coordinate system (Yes in Step 501), a self location is recalculated retroactive to a predetermined time before a timing at which the separation has occurred (retroactive to a timing at which the train has started running), in estimation of the self location in the world coordinate system (Step 502).

In addition, when the first mobile object coordinate system is separated from the world coordinate system, a self location is recalculated retroactive to a predetermined time before a timing at which the separation has occurred (retroactive to a timing at which the train 90 has started running), in estimation of the self location in the first mobile object coordinate system (Step 503).

When the first mobile object coordinate system is separated from the world coordinate system at this time (Yes in Step 602), a location at which the virtual character 20i is to be placed and a posture to be taken by the virtual character 20i are calculated by using the first mobile object coordinate system to which the seat 91 belongs (Step 605 to Step 607).

While the train 90 is running, the self location is estimated on the basis of feature quantities of the world coordinate system (scenery seen through windows in FIG. 20).

In the process of placing a virtual object 20, it is assumed that a distance between the smartphone 200 (the user) and a mountain 82 becomes a threshold or less (Yes in Step 601). In this case, a location at which a virtual object 20k including information regarding the mountain is to be placed and a posture to be taken by the virtual object 20k are calculated by using the world coordinate system to which the mountain 82 belongs (Step 607).

When the running train 90 is stopping and the degrees of coincidence between the inertial information and movements of the respective feature quantity groups corresponding to the structural elements of the train 90 exceed a threshold (No in Step 205), the feature quantity groups corresponding to the respective structural elements of the train 90 are classified into the world coordinate system (Step 206). Next, the first mobile object coordinate system is integrated into the world coordinate system (Step 307).

In the self location estimation process, a self location is estimated in the world coordinate system to which the seat 91 belongs (Step 401 to Step 411).

When the first mobile object coordinate system is integrated into the world coordinate system at this time (Yes in Step 603), a location at which the virtual character 20i is to be placed and a posture to be taken by the virtual character 20i are calculated by using the world coordinate system to which the seat 91 belongs (Step 605 to Step 607).

When the user walks and gets off the train 90, the virtual character 20i also walks and gets off the train 90 in the image (the virtual character 20i is set to follow the user).

The second embodiment achieves effects similar to the above-described first embodiment. For example, it is possible to prevent a situation where the virtual character 20i moves behind the train 90 and the user cannot see the virtual character 20i while the train 90 is moving.

<<Various Modifications>>

Here, with reference to FIG. 10, it is assumed that only the virtual object 20a is placed above the dashboard 31 in the first mobile object coordinate system (in other words, virtual objects 20 are not placed on the building 22, the road 21, or the oncoming car 25). In such a case, the feature quantity groups corresponding to the respective structural elements of the car 30 in the image information are necessary to estimate a self location in the first mobile object coordinate system. On the other hand, feature quantity groups corresponding to scenery outside the windows are not necessary.

In such a case, the control unit 1 may change parameters of the imaging units 4 to clearly capture images of the respective structural elements of the car 30 that are necessary for now. For example, in the case of daytime, the inside of the car 30 is darker than the outside. Therefore, the control unit 1 changes parameters related to image capturing such as exposure time and gain for clearly capturing an image of the dark place.

Conversely, with reference to FIG. 10, it is assumed that only the virtual objects 20 of the building 22, the road 31, and the oncoming car 25 are placed in the world coordinate system and the second mobile object coordinate system (in other words, a virtual object 20 is not placed above the dashboard 31). In such a case, the feature quantity groups corresponding to the scenery outside the windows in the image information are necessary to estimate a self location in the world coordinate system and the second mobile object coordinate system. On the other hand, feature quantity groups corresponding to the respective structural elements of the car 30 are not necessary.

In such a case, the control unit 1 may change parameters of the imaging units 4 to clearly capture images of the outside scenery that is necessary for now. For example, in the case of daytime, the outside is brighter than the inside of the car 30. Therefore, the control unit 1 changes parameters related to image capturing such as exposure time and gain for clearly capturing an image of the well-lighted place.

Typically, it is only necessary for the control unit 1 to change parameters related to image capturing performed by the imaging units 4 for each of the coordinate systems to be used. This makes it possible to further improve accuracy of estimation of a self location in each coordinate system.

It is also possible to fix an outside imaging unit to the first mobile object such as the car 30 or the train 90. The outside imaging unit is configured to capture an image of the HMD 100 or the smartphone 200. The control unit 1 acquires an image of the HMD 100 or the smartphone 200 captured by the outside imaging unit, and uses the image for estimating a self location in the first mobile object coordinate system. This makes it possible to further improve accuracy of estimation of the self location in the first mobile object coordinate system.

The present technology is applicable to various kinds of fields such as a field related to daily life like shopping, a field related to a job like business, and a field related to amusement like a game or an amusement ride, for example. Typically, the present technology is applicable to any fields as long as a situation where the user is in the first mobile object is assumed.

In the above description, the HMD 100 and the smartphone 200 have been used as examples of the information processing apparatus. However, the information processing apparatus is not limited thereto. For example, the information processing apparatus may be a wearable apparatus other than the HMD 100 such as a wristband wearable apparatus, a ring-like wearable apparatus, or a pendant-like wearable apparatus. Alternatively, the information processing apparatus may be a mobile phone other than the smartphone 200, a tablet personal computer (PC), a laptop PC, or the like. In addition, the above-described processes performed by the control unit 1 may be executed by a server apparatus (an information processing apparatus) on a network.

In the above-description, the present technology has been applied to an AR technology. However, it is also possible to apply the present technology to VR technologies. For example, the present technology makes it possible to accurately estimate a self location in the case where the user is enjoying a VR technology (for example, a game or the like) while riding the first mobile object.

The present technology may also be configured as below.
(1) An information processing apparatus including:
an imaging unit that acquires image information;
an inertial sensor that acquires inertial information; and
a control unit that estimates a self location of the information processing apparatus on the basis of the image information and the inertial information, recognizes a situation of a user with the information processing apparatus, and changes a ratio of reliability between the image information and the inertial information that are to be used for estimating the self location depending on the situation.
(2) The information processing apparatus according to (1),
in which the control unit extracts feature quantities from the image information, and determines which of the feature quantities is to be used for estimating the self location depending on the situation.
(3) The information processing apparatus according to (1) or (2),
in which the control unit is capable of setting one or more coordinate systems depending on the situation, and estimates a self location in each of the one or more coordinate systems.
(4) The information processing apparatus according to (3),
in which the control unit changes the ratio in such a manner that the one or more coordinate systems have different ratios.
(5) The information processing apparatus according to (3) or (4), in which
the one or more coordinate systems include a first mobile object coordinate system based on a first mobile object that moves while carrying the user, and
the control unit changes the ratio in such a manner that, among the image information and the inertial information, the image information is to be used more reliably for estimating a self location in the first mobile object coordinate system.
(6) The information processing apparatus according to (5),
in which the control unit changes the ratio in such a manner that, among the image information and the inertial information, only the image information is to be used reliably for estimating a self location in the first mobile object coordinate system.
(7) The information processing apparatus according to any one of (3) to (6), in which
the one or more coordinate systems include a second mobile object coordinate system based on a second mobile object that moves without relation to the user, and
the control unit changes the ratio in such a manner that, among the image information and the inertial information, the image information is to be used more reliably for estimating a self location in the second mobile object coordinate system.
(8) The information processing apparatus according to (7),
in which the control unit changes the ratio in such a manner that, among the image information and the inertial information, only the image information is to be used reliably for estimating a self location in the second mobile object coordinate system.
(9) The information processing apparatus according to any one of (1) to (8),
in which the control unit estimates the self location through a Kalman filtering process, and the ratio is Kalman gain.
(10) The information processing apparatus according to any one of (3) to (9),
in which the control unit extracts feature quantities from the image information, and determines which of the feature quantities in the image information is to be used for estimating the self location in each of the one or more coordinate systems.
(11) The information processing apparatus according to (10),
in which the control unit determines degrees of coincidence between the inertial information and movements of the feature quantities, and determines which of the feature quantities in the image information is to be used for estimating the self location in each of the one or more coordinate systems on the basis of the degrees of coincidence.
(12) The information processing apparatus according to any one of (3) to (11), in which
the one or more coordinate systems include a world coordinate system based on the earth, and a first mobile object coordinate system based on a first mobile object that moves while carrying the user, and
the control unit determines whether the first mobile object coordinate system is separated from the world coordinate system on the basis of the image information, and sets the first mobile object coordinate system when the separation has occurred.
(13) The information processing apparatus according to (12),
in which, when the separation has occurred, the control unit recalculates the self location retroactive to a predetermined time before a timing at which the separation has occurred, in estimation of the self location in the world coordinate system.
(14) The information processing apparatus according to (12) or (13),
in which, when the separation has occurred, the control unit recalculates the self location retroactive to a predetermined time before a timing at which the separation has occurred, in estimation of the self location in the first mobile object coordinate system.

(15) The information processing apparatus according to any one of (3) to (14), in which the one or more coordinate systems include a world coordinate system based on the earth, and a second mobile object coordinate system based on a second mobile object that moves without relation to the user, and the control unit determines whether the second mobile object coordinate system is separated from the world coordinate system on the basis of the image information, and sets the second mobile object coordinate system when the separation has occurred.

(16) The information processing apparatus according to (15), in which, when the separation has occurred, the control unit recalculates the self location retroactive to a predetermined time before a timing at which the separation has occurred, in estimation of the self location in the world coordinate system.

(17) The information processing apparatus according to (15) or (16), in which, when the separation has occurred, the control unit recalculates the self location retroactive to a predetermined time before a timing at which the separation has occurred, in estimation of the self location in the second mobile object coordinate system.

(18) The information processing apparatus according to any one of (3) to (17), in which, for each of the one or more coordinate systems, the control unit changes a parameter related to image capturing performed by the imaging unit.

(19) An information processing method including:

estimating a self location of an information processing apparatus on the basis of image information and inertial information;

recognizing a situation of a user with the information processing apparatus; and changing a ratio of reliability between the image information and the inertial information that are to be used for estimating the self location, depending on the situation.

(20) A program that causes a computer to function as a control unit that:

estimates a self location of an information processing apparatus on the basis of image information and inertial information;

recognizes a situation of a user with the information processing apparatus; and changes a ratio of reliability between the image information and the inertial information that are to be used for estimating the self location, depending on the situation.

REFERENCE SIGNS LIST 1, 71 control unit
4, 74 imaging unit
5, 75 inertial sensor
20 virtual object
30 car
50 cart
90 train
100 head-mounted display
200 smartphone

The invention claimed is:

1. An information processing apparatus, comprising:
a camera configured to acquire image information;
an inertial sensor configured to acquire inertial information; and
circuitry configured to:
estimate a self location of the information processing apparatus based on the image information and the inertial information;
recognize a situation of a user of the information processing apparatus; and
change a ratio of reliability between the image information and the inertial information, that are to be used for the estimation of the self location, depending on the situation.

2. The information processing apparatus according to claim 1, wherein the circuitry is further configured to:
extract feature quantities from the image information; and
determine which of the feature quantities is to be used for the estimation of the self location depending on the situation.

3. The information processing apparatus according to claim 1, wherein the circuitry is further configured to:
set one or more coordinate systems depending on the situation; and
estimate the self location in each coordinate system of the one or more coordinate systems.

4. The information processing apparatus according to claim 3, wherein the circuitry is further configured to change the ratio such that the one or more coordinate systems have different ratios.

5. The information processing apparatus according to claim 3, wherein
the one or more coordinate systems include a first mobile object coordinate system based on a first mobile object that moves while carrying the user, and
the circuitry is further configured to change the ratio such that, among the image information and the inertial information, the image information is to be used more reliably for the estimation of the self location in the first mobile object coordinate system.

6. The information processing apparatus according to claim 5, wherein the circuitry is further configured to change the ratio such that, among the image information and the inertial information, the image information is to be used for the estimation of the self location in the first mobile object coordinate system.

7. The information processing apparatus according to claim 3, wherein
the one or more coordinate systems include a second mobile object coordinate system based on a second mobile object that moves without relation to the user, and
the circuitry is further configured to change the ratio such that, among the image information and the inertial information, the image information is to be used more reliably for the estimation of the self location in the second mobile object coordinate system.

8. The information processing apparatus according to claim 7, wherein the circuitry is further configured to change the ratio such that, among the image information and the inertial information, the image information is to be used for the estimation of the self location in the second mobile object coordinate system.

9. The information processing apparatus according to claim 1, wherein
the circuitry is further configured to estimate the self location through a Kalman filtering process, and
the ratio is Kalman gain of the Kalman filtering process.

10. The information processing apparatus according to claim 3, wherein the circuitry is further configured to:
extract feature quantities from the image information; and
determine which of the feature quantities in the image information is to be used for the estimation of the self location in each coordinate system of the one or more coordinate systems.

11. The information processing apparatus according to claim 10, wherein the circuitry is further configured to:
determine degrees of coincidence between the inertial information and movements of the feature quantities; and
determine which of the feature quantities in the image information is to be used for the estimation of the self location in each coordinate system of the one or more coordinate systems based on the degrees of coincidence.

12. The information processing apparatus according to claim 3, wherein
the one or more coordinate systems include a world coordinate system based on the earth, and a first mobile object coordinate system based on a first mobile object that moves while carrying the user, and
the circuitry is further configured to:
determine whether the first mobile object coordinate system is separated from the world coordinate system based on the image information; and
set the first mobile object coordinate system in a case where the separation has occurred.

13. The information processing apparatus according to claim 12, wherein, in the case where the separation has occurred, the circuitry is further configured to recalculate the self location retroactive to a determined time before a timing at which the separation has occurred, in the estimation of the self location in the world coordinate system.

14. The information processing apparatus according to claim 12, wherein, in the case where the separation has occurred, the circuitry is further configured to recalculate the self location retroactive to a determined time before a timing at which the separation has occurred, in the estimation of the self location in the first mobile object coordinate system.

15. The information processing apparatus according to claim 3, wherein
the one or more coordinate systems include a world coordinate system based on the earth, and a second mobile object coordinate system based on a second mobile object that moves without relation to the user, and
the circuitry is further configured to:
determine whether the second mobile object coordinate system is separated from the world coordinate system based on the image information; and
set the second mobile object coordinate system in a case where the separation has occurred.

16. The information processing apparatus according to claim 15, wherein, in the case where the separation has occurred, the circuitry is further configured to recalculate the self location retroactive to a determined time before a timing at which the separation has occurred, in the estimation of the self location in the world coordinate system.

17. The information processing apparatus according to claim 15, wherein, in the case where the separation has occurred, the circuitry is further configured to recalculate the self location retroactive to a determined time before a timing at which the separation has occurred, in the estimation of the self location in the second mobile object coordinate system.

18. The information processing apparatus according to claim 3, wherein, for each coordinate system of the one or more coordinate systems, the circuitry is further configured to change a parameter related to image capturing executable by the camera.

19. An information processing method, comprising:
estimating a self location of an information processing apparatus based on image information and inertial information;
recognizing a situation of a user of the information processing apparatus; and
changing a ratio of reliability between the image information and the inertial information, that are to be used for the estimation of the self location, depending on the situation.

20. A non-transitory computer-readable medium having stored thereon, computer-executable instructions which, when executed by a processor of an information processing apparatus, cause the processor to execute operations, the operations comprising:
estimating a self location of the information processing apparatus based on image information and inertial information;
recognizing a situation of a user of the information processing apparatus; and
changing a ratio of reliability between the image information and the inertial information, that are to be used for the estimation of the self location, depending on the situation.

* * * * *